United States Patent
Taylor et al.

(10) Patent No.: US 10,528,916 B1
(45) Date of Patent: Jan. 7, 2020

(54) COMPETENCY-BASED QUESTION SELECTION FOR DIGITAL EVALUATION PLATFORMS

(71) Applicant: HireVue, Inc., South Jordan, UT (US)

(72) Inventors: Benjamin Taylor, Lehi, UT (US); Daniel Bray, Orem, UT (US); Loren Larsen, Lindon, UT (US); Christopher Luman, Salt Lake City, UT (US)

(73) Assignee: HireVue Inc., South Jordan, UT (US)

( * ) Notice: Subject to any disclaimer, the term of this patent is extended or adjusted under 35 U.S.C. 154(b) by 703 days.

(21) Appl. No.: 14/935,282

(22) Filed: Nov. 6, 2015

Related U.S. Application Data

(60) Provisional application No. 62/076,396, filed on Nov. 6, 2014.

(51) Int. Cl.
| | |
|---|---|
| *G06Q 10/00* | (2012.01) |
| *G06Q 10/10* | (2012.01) |
| *G06N 20/00* | (2019.01) |
| *G06Q 50/20* | (2012.01) |
| *G06Q 10/06* | (2012.01) |

(52) U.S. Cl.
CPC ......... *G06Q 10/1053* (2013.01); *G06N 20/00* (2019.01); *G06Q 10/10* (2013.01); *G06Q 50/20* (2013.01); *G06Q 10/063112* (2013.01)

(58) Field of Classification Search
USPC ................................................. 705/320, 321
See application file for complete search history.

(56) References Cited

U.S. PATENT DOCUMENTS

| | | | | |
|---|---|---|---|---|
| 7,184,969 | B1 * | 2/2007 | Bonnstetter | G06Q 10/00 705/7.14 |
| 7,991,635 | B2 * | 8/2011 | Hartmann | G06Q 10/06311 705/7.14 |
| 9,117,201 | B2 * | 8/2015 | Kennell | G06Q 10/1053 |
| 9,378,486 | B2 * | 6/2016 | Taylor | G06Q 10/1053 |

(Continued)

OTHER PUBLICATIONS

Breiman, Leo. "Random forests." Machine learning 45, No. 1 (2001): 5-32.
Elith, Jane, John R. Leathwick, and Trevor Hastie. "A working guide to boosted regression trees." Journal of Animal Ecology 77.4 (2008): 802-813.

(Continued)

*Primary Examiner* — Gabrielle A McCormick
(74) *Attorney, Agent, or Firm* — Lowenstein Sandler LLP

(57) ABSTRACT

Described are methods and systems for interview competency and question validation and analysis to improve the effectiveness of evaluation campaigns. In one method, processing logic of an interview design program, hosted by a digital evaluation platform, receives a request from a first device to create a digital interview for a position. The interview design program sends a list of competencies associated with the position and receives a selection of a set of desired competencies. The interview design program determines a list of questions that differentiate candidates within the desired competencies, ranks the list of questions by importance, and sends the list of questions and the ranking information to the first device and receives a selection of a set of desired questions. The interview design program creates the digital interview with the set of desired questions. The digital evaluation platform presents the digital interview to a candidate on a second device.

20 Claims, 18 Drawing Sheets

(56) References Cited

U.S. PATENT DOCUMENTS

| | | | | |
|---|---|---|---|---|
| 2002/0055866 | A1* | 5/2002 | Dewar | G06Q 10/06311 |
| | | | | 705/7.38 |
| 2003/0071852 | A1* | 4/2003 | Stimac | G06Q 10/10 |
| | | | | 715/810 |
| 2009/0254401 | A1* | 10/2009 | Blanchard | G06Q 10/00 |
| | | | | 705/7.27 |
| 2009/0299993 | A1* | 12/2009 | Novack | G06Q 10/06 |
| 2011/0145161 | A1* | 6/2011 | Scarborough | G06Q 10/063 |
| | | | | 705/321 |
| 2011/0295759 | A1* | 12/2011 | Selvakummar | G06Q 10/06311 |
| | | | | 705/321 |
| 2013/0297553 | A1* | 11/2013 | Bierner | G06N 20/00 |
| | | | | 706/52 |
| 2016/0117380 | A1* | 4/2016 | Wong | G09B 5/02 |
| | | | | 707/740 |

OTHER PUBLICATIONS

Hearst, Marti A., Susan T. Dumais, Edgar Osman, John Platt, and Bernhard Scholkopf. "Support vector machines." Intelligent Systems and their Applications, IEEE 13, No. 4 (1998): 18-28.

Kaslow, Nadine J., Nancy J. Rubin, Muriel J. Bebeau, Irene W. Leigh, James W. Lichtenberg, Paul D. Nelson, Sanford M. Portnoy, and I. Leon Smith. "Guiding principles and recommendations for the assessment of competence." Professional Psychology: Research and Practice 38, No. 5 (2007): 441.

Campion, Michael A., et al. "Doing competencies well: Best practices in competency modeling." Personnel Psychology 64.1 (2011): 225-262.

Hinton, Geoffrey E., Simon Osindero, and Yee-Whye Teh. "A fast learning algorithm for deep belief nets." Neural computation 18.7 (2006): 1527-1554.

* cited by examiner

FIG. 6

COMPETENCY-BASED QUESTION SELECTION FOR DIGITAL EVALUATION PLATFORMS

RELATED APPLICATIONS

This application claims the benefit of U.S. Provisional Application No. 62/076,396, filed Nov. 6, 2014, and entitled "Automatic Validated Interview and Competency Process," the entire contents of which are incorporated herein by reference.

BACKGROUND

Finding and hiring employees is a task that impacts most modern businesses. It is important for an employer to find employees that "fit" open positions. Criteria for fitting an open position may include skills necessary to perform job functions. Employers may also want to evaluate potential employees for mental and emotional stability, ability to work well with others, ability to assume leadership roles, ambition, attention to detail, problem solving, personality, etc.

However, the processes associated with finding employees can be expensive and time consuming for an employer. Such processes can include evaluating resumes and cover letters, telephone interviews with candidates, in-person interviews with candidates, drug testing, skill testing, sending rejection letters, offer negotiation, training new employees, etc. A single employee candidate can be very costly in terms of man-hours needed to evaluate and interact with the candidate before the candidate is hired.

Employers may involve expensive professionals, such as Industrial-Organization (I-O) Psychologists, to provide expert input on interview questions and areas of skills to test when interviewing candidates. I-O psychologists may also bring in or survey subject matter experts to develop interview questions that can be used to help identify one or more candidates from the candidate pool. Additional effort, time, and funds may need to be expended to analyze and update the interview structure after the initial design to assess and improve the effectiveness of the interview. This process of updating the interview structure can be time-consuming and expensive as a great deal of time is needed from one or more specially-trained, skilled professionals.

The subject matter claimed herein is not limited to embodiments that solve any particular disadvantages or that operate only in environments such as those described above. Rather, this background is only provided to illustrate one exemplary technology area where some embodiments described herein may be practiced.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 6 is an exemplary view of a graphical user interface for viewing digital interviews according to one embodiment.

Figure 1:
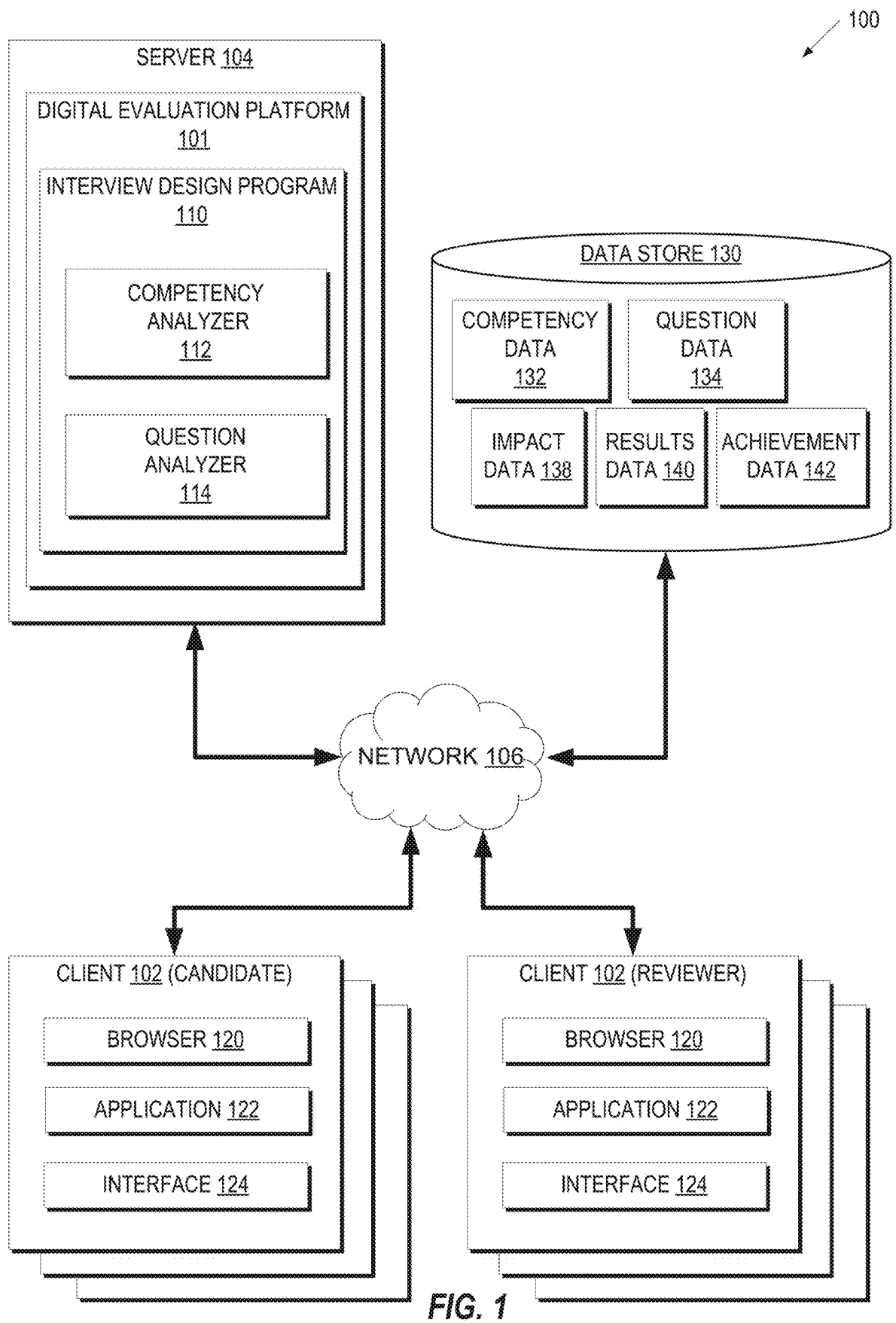
FIG. 1 is a block diagram of an exemplary network architecture in which some embodiments of a digital evaluation platform may operate.

Some aspects of these figures may be better understood by reference to the following Detailed Description.

DETAILED DESCRIPTION

With the ability to recruit for positions nationally and even internationally using the Internet, the number of qualified candidates applying for a given job can be very large. Handling large numbers of diversely located candidates with diverse skill sets can be expensive and time consuming. For technical or high-skill positions, subject-matter experts are used to generate question sets pertaining to the available positions for entities looking to hire. Similarly, subject-matter experts may generate question sets to assess employee performance, satisfaction, or gain insight through various other evaluations after hiring or evaluations unrelated to the hiring process.

Digital interviews or other digital evaluations may include recording and evaluating responses of applicants or candidates to a series of prompts or questions. These digital interviews can be conducted on a digital evaluation platform (also referred to as a digital interview platform). Examples of such digital evaluations may include a pitch for investment funding or a grant, an admissions interview, a job performance evaluation, and other presentations or interactions meriting assessment and comparison. While this disclosure includes several examples directed to digital evaluations conducted to fill job positions, the principles and features may be equally applied to other contexts as well.

For a company or other organization that is performing an evaluation campaign, an operator of the digital evaluation platform can manually enter questions into the digital evaluation platform. These questions may be the result of the manual process described above with the involvement of I-O psychologists, subject-matter experts, or both. In some cases, the digital evaluation platform may have stored questions or prompts previously used in other evaluation campaigns, such as a campaign for hiring a software engineer. The embodiments described herein are directed to digital evaluation platforms for differentiating candidates according to desired competencies. As described herein in various embodiments herein, an operator can use an interview design program hosted by a digital evaluation platform to select questions that differentiate candidates (or reviewees) with respect to one or more desired competencies for the position. Questions may be selected for a specific campaign, such as the hiring campaign to hire the software engineer. The questions or prompts may be different from campaign to campaign. In some cases, the questions or prompts may be similar from campaign to campaign so long as they differentiate candidates based on the desired competencies. For example, one or more of the questions in a given campaign may be included to get a feeling for a candidate's competency in a certain area, a feeling for a likelihood of success at the position if hired, or the like. Examples of some competencies may include drive, dedication, creativity, motivation, communication skills, teamwork, energy, enthusiasm, determination, reliability, honesty, integrity, intelligence, pride, dedication, analytical skills, listening skills, achievement profile, efficiency, economy, procedural awareness, opinion, emotional intelligence, etc.

Different positions, entities, or markets may require unique sets of competencies. For example, certain sales positions may require greater listening skills to succeed while other sales positions may favor determination. Traditionally, an I-O Psychologist may be engaged to orchestrate subject matter experts to analyze and assess the appropriate competencies for the specific position for which a campaign is being launched. However, the use of highly-trained specialists like an I-O psychologist involves considerable investments in time and funds, as well as other resources that could be allocated to other efforts.

In one embodiment, an interview design program can be hosted by a digital evaluation platform. The interview design program may use software or other processing logic executed by one or more machines of the digital evaluation platform. The interview design program may present user interfaces to an operator of the digital evaluation platform over a public or private network. In other embodiments, the digital evaluation platform can present the user interfaces to a display associated with the machine upon which the interview design program is executing. In some embodiments, the interview design program receives a request over a network from a first device to create a digital interview to evaluate candidates. The request identifies a position for which the candidates are to be evaluated. The interview design program sends back a first response over the network to the first device. The first response includes a list of potential competencies associated with the position. The interview design program receives a first selection of a set of desired competencies. The set of desired competencies includes a subset or all of the list of potential competencies. The interview design program determines a list of questions that differentiate candidates with respect to the set of desired competencies. The interview design program may also determine ranking information describing an importance of each of the list of questions relative to individual competencies of the set of desired competencies. The interview design program sends over the network to the first device a second response including the list of questions and the ranking information. The interview design program may then receive a second selection of a set of desired questions comprising a subset or all of the list of questions. The interview design program creates the digital interview with the set of desired questions. Once created, the interview design program can present the digital interview to a candidate on a second device. This may be done by sending a user interface to a browser (or other program or app) executing on the second device.

Some embodiments of the digital evaluation platform described herein use predictive functions using computational learning theories. For example, the digital evaluation platform can use machine learning to train a predictive function using historical data. The predictive function, also referred to as a predictive model or a trained model, can be developed using a machine-learning system. The model may be trained, for example, by a machine-learning system. The machine-learning system can be provided with historical information relating to past competency scores for candidates in a previous campaign, as well as the outcome for the candidates (such as hired or not). Various machine-learning schemes may be implemented to train a model using this information as described herein. As described herein, the machine-learning systems can be supervised learning or unsupervised learning. In supervising learning, the machine-learning system is presented with historical inputs of candidates and their corresponding outputs. This data can be referred to as the training set. The goal of the machine-learning system is to learn a predictive function that maps inputs to the outputs. The predictive function can then be used on new inputs for additional candidates. In unsupervised learning, no labels may be given to the machine-learning system, leaving the machine-learning system itself to find structure in its input. Unsupervised learning can be a goal in itself (discovering hidden patterns in data) or a means towards an end. Often machine-learning systems implement one or more machine-learning algorithms (also referred to as machine-learning schemes). Some examples of possible machine-learning schemes include support vector machines, regression algorithms, neural networks, tree-structured classifiers, and ensemble techniques (such as bootstrapping, gradient boosted regression, etc.). Other machine-learning schemes or modeling schemes may be incorporated.

Methods and systems for interview building using competency and question validation and analysis to improve the quality and efficacy of digital interviews are described herein. In the following description, numerous details are set forth. In one embodiment, a digital evaluation platform may host an interview design program. The digital evaluation platform may train a model using current and historical interview data. The digital evaluation platform may validate questions from a question bank as impacting a competency. The digital evaluation platform may also inter-map questions, competencies, and positions. The interview design program may provide a tool for designing a digital interview leveraging the model of the digital evaluation platform and the validated question and competency database. The digital evaluation platform may further predict a candidate performance based on responses to the digital interview.

In some instances in this description, well-known structures and devices are shown in block diagram form, rather than in detail, in order to avoid obscuring the embodiments of the present invention. It will be apparent, however, to one of ordinary skill in the art having the benefit of this disclosure, that embodiments of the present invention may be practiced without these specific details.

Embodiments described herein can be used to address at least two identified problems of candidate selection, namely cost and complexity of building a digital interview to screen large candidate pools and leveraging large databases of available questions and competencies. The embodiments described herein provide solutions to these problems by providing a model based on historical data and a management system to leverage the database of questions and competencies. A company that interviews a candidate field for a particular position may benefit from the ability of the digital evaluation platform to validate potential competencies and questions and then build an effective interview using these validate assets. Additionally, the use of the combined data sets may enable the digital evaluation platform to provide more decisive prompts as templates when a company sets up a new campaign in the digital evaluation platform. Further advantages achieved by the system described herein include portability to operate on relatively large and small datasets, rapid adjustment to new data, customization options, and provide question and competency discovery and suggestion. Other examples may provide further advantages as described herein.

FIG. 1 is a block diagram of a network architecture 100 in which embodiments of an interview design program 110 may operate. The network architecture 100 may include multiple client computing systems 102 coupled to a server computing system 104 via a network 106 (e.g., a public network such as the Internet, a private network such as a local area network (LAN), or a combination thereof). The network 106 may include the Internet and network connections to the Internet. Alternatively, the server 104 and the clients 102 may be located on a common LAN, personal area network (PAN), campus area network (CAN), metropolitan area network (MAN), wide area network (WAN), wireless local area network, cellular network, virtual local area network, or the like. The server computing system 104 (also referred to herein as server 104) may include one or more machines (e.g., one or more server computer systems, routers, gateways) that have processing and storage capabilities to provide the functionality described herein.

The server computing system 104 may execute a digital evaluation platform 101 which hosts an interview design program 110. The interview design program 110 can perform various functions as described herein and may include a competency analyzer 112 to analyze and perform other functions and features relative to competencies associated with the interview design program 110 hosted by a digital evaluation platform 101 and a question analyzer 114 to analyze and perform other functions and features relative to questions associated with the interview design program 110. The features of the interview design program 110, including the competency analyzer 112 and the question analyzer 114 are described in more detail herein. The interview design program 110 can be implemented as part of the digital evaluation platform 101, such as the HireVue® digital interviewing platform developed by HireVue, Inc., or may be implemented in another digital evaluation platform, such as an investment evaluation platform, an admission evaluation platform, a performance review, or the like.

The interview design program 110 can be implemented as a standalone system that interfaces with the digital evaluation platform 101 or other systems. It should also be noted that in this embodiment, the server computing system 104 implements the interview design program 110, but one or more of the clients 102 may also include client modules of the interview design program 110 that can work in connection with, or independently from the functionality of the interview design program 110 as depicted on the server computing system 104.

In some embodiments, historical information from the data store 130 (such as the competency data 132 and the question data 134, in conjunction with the results data 140 and achievement data 142) may be used in conjunction with a predictive function for use on current candidate evaluations. The historical data may include information from past evaluations and hiring campaigns. For example, information can be identified from previous candidate evaluations including actual candidate responses and outcomes from the candidate evaluations. The information may include a score, given by an evaluator, for a candidate in each competency based on their responses. In a campaign, a percentage of the evaluated candidates may ultimately be hired. At some point after the hiring is complete, achievement or performance values may be associated with the hired candidates. These may be generated by, for example, sales numbers, hitting goals, project completions, pay raises, promotions, time with the company, test scores, commissions earned, performance reviews, etc. These metrics may be compared to scores associated with each competency included in the candidate evaluation process. The comparison can reveal which competencies in the evaluation are most telling and impactful in determining future performance of the candidate. For example, it may be determined that a hire with a high number of sales stored in the achievement data 142 is predicted more reliably by a high score from the candidate evaluation in the competency of "motivation." In response to this determination, the competency of motivation with the associated questions may be validated for sales positions for that employer, for sales positions of that product or service, or for sales positions in general.

For example, an initial determination for the competency may be determined by tracking the competency data 132 included in the candidate evaluation and comparing the scores of each candidate to whether or not the candidate was successfully hired. In one example, the information relating to the competencies may be stored in a matrix corresponding to the candidates as shown here:

|     | motivation | engagement | listening | communication | confidence |
|-----|------------|------------|-----------|---------------|------------|
| X = | 1 | 1 | 2 | 5 | 1 |
|     | 2 | 0 | 2 | 3 | 5 |
|     | 5 | 5 | 3 | 2 | 4 |
|     | 3 | 5 | 4 | 1 | 2 |
|     | . | . | . | . | . |
|     | . | . | . | . | . |
|     | . | . | . | . | . |
|     | 5 | 5 | 4 | 1 | 3 |

In the achievement matrix shown above, the columns denote the competencies tested while the rows correspond to individual candidates. The values in the matrix represent raw scores given to the corresponding candidate in that competency. This score may be assigned by an automated scoring system or by a human evaluator. In the depicted example, Scores are given between zero and five. However, other ranges or schemes may be used. For example, a categorical system or range such as A+ to D− or Excellent/Satisfactory/Poor may be used.

Additionally, an achievement index may be populated as a companion to the achievement matrix above. In one example, the achievement index may store an indication of a relevant achievement by the candidate as shown here:

|     | achievement score |
|-----|-------------------|
| y = | 1 |
|     | 0 |
|     | 0 |
|     | 0 |
|     | . |
|     | . |
|     | . |
|     | 1 |

In the achievement index shown above, the single column corresponds to an achievement score (for example, whether or not the candidate was hired) while each row corresponds to an individual candidate. In this example, the values stored to the index are Boolean flags (1=true (hired) and 0=false (not hired)). The achievement matrix may also include other information related to the candidate. For example, the achievement matrix may include job performance, such as sales targets or other performance targets, credentialing examination performance, work advancement rates, task efficiency, realization, etc. Some example of credentialing examination performance may include whether a candidate passed or failed a credentialing exam, such as a bar exam, a stockbroker exam, CPA exam, boards, etc. Many other factors may be used in creating an achievement index. The likelihood of a separation of termination of a selected candidate may be included as well as subsequent academic performance. For example, a grade point average (GPA) may be used in generating an achievement index value for a selected candidate. Academic test scores may be included as well and added into the historical data set after being received by the selected candidate. Some exemplary test scores may include scores for the MCAT, PCAT, DAT, GMAT, LSAT, GRE, etc. An estimation of the likelihood of finishing an academic program may be a factor in an achievement index.

In some embodiments, the amount of grant money received by a selected candidate and/or a number of grants received may be included in achievement data used to create an achievement index. Similarly, papers or other academic, scientific, or professional writings and/or presentations may be included in the creation of an achievement index. In some embodiments, a cumulative citation factor may be provided. For example, a citation factor may be determined on the quality or reputation of the publication in which the paper or writing issues or on the forum in which a presentation is made. The sum of citation factors may indicate high performance and/or professional involvement of the selected candidate.

In general, any performance metric that may be used to assess a selected candidate in work performance or in performance in an academic program, etc., may be used in assessing the decisiveness and/or predictiveness of competencies and questions. This information may be provided as achievement data in a database and made accessible to the evaluation campaign platform 110.

In other embodiments, other values or schemes may be used. For example, the index may store values such as Yes/Future Candidate/No. Values may also be categorical as described above with reference to the achievement matrix. In the illustrated index, it appears that the topmost candidate was hired as well as the bottommost candidate.

As this information is fed into a machine-learning system, the model will be able to predict an outcome for a candidate based on his/her scores in one or more competencies which are based on the response of the candidate to one or more questions. The model will also be able to indicate which competencies have been shown to impact specific positions. Once the competency has been identified as impactful, the model may be further trained with respect to potential questions that may make up the individual competency.

In one example, in order to validate these models, portions of the data may be used for training (i.e. 70% of the data) and the remaining data (i.e. 30% of the data) will be used to assess statistical merit. This may be done to reduce the chances of overfitting. The remaining data can also be referred to as the validation or holdout set. From the remaining data, performance metrics can be determined such as classification accuracy, mean absolute error (MAE), root mean squared error (RME), correlation coefficient r, the area under the receiver operator curve (AUROC), or any other metric used to validate fit quality. Doing a single train/test split may create a conflict where there is an incentive to train on larger portions of the data but in doing so, the validation set becomes less statistically significant. To address this, more advanced methods such as k-folding or stratified k-folding can be used to allow larger portions of the data to be use for training. K-folding allows one to predict the entire dataset out-of-sample by creating multiple models on different portions of the data. Predicting more outcome values from different training segmentations allows for a more robust estimate for the model's future performance and validation. After the model has been validated, and exceeds the predefined performance targets (i.e. r=0.3), it can be used to predict a candidate's fit for the organization based on the rated competencies. This process, which used to require a subject matter expert to spend time developing, can now have improved accuracy while at the same time becoming more efficient as described herein. The process may also be kept up-to-date in a changing environment of varying business needs and candidates.

In some examples, a bank of questions may be stored in a data storage location. The questions may have historical information of usage in previous interviews. For example, historical information for the questions may be stored in a binary matrix shown below:

|     | Question-9890 | Question-9891 | Question-9892 | Question-9893 | Question-9894 |
|-----|---------------|---------------|---------------|---------------|---------------|
| X = | 1 | 0 | 0 | 0 | 1 |
|     | 0 | 0 | 0 | 0 | 0 |
|     | 0 | 0 | 0 | 0 | 0 |
|     | 1 | 0 | 0 | 1 | 0 |
|     | . | . | . | . | . |
|     | . | . | . | . | . |
|     | . | . | . | . | . |
|     | 0 | 0 | 0 | 1 | 0 |

The depicted binary matrix includes columns associated with questions from the question bank while the rows are associated with candidates who have been presented with questions from the question bank. The binary value of 1 indicates that the question has been asked of the corresponding candidate. This matrix may be used for regression with a competency score index as shown below:

|     | competency score |
|-----|------------------|
| y = | 1.2 |
|     | 4.5 |
|     | 3.0 |
|     | 2.15 |
|     | . |
|     | . |
|     | 0.5 |

This competency score index corresponds to a particular competency such as the competency of motivation. The questions of the binary matrix above may correspond to the same competency. The competency score index includes a competency score for each candidate. The competency score may be created by an automated system or assigned by a human evaluator. In one example, the model may take in the binary matrix and the competency score index and execute a machine-learning process to determine which of the questions asked resulted in a change in the competency scores of the candidate field. The question identified as impacting the competency score is then validated for use in an interview. The validated question may be added to a group of validated questions associated with the corresponding competency. The questions may also be ranked by the amount of impact they have on the competency score. In one example, the question may split the competency score for a candidate field by a slight margin while another question may produce a wider spread. The question producing the greater difference in scores may be ranked higher than the question producing the lesser difference. Other manners of ranking the scores by impact or decisiveness may be incorporated.

In one example, a general predictive model or function for determining the decisiveness of a prompt or question may be expressed by:

$$y=F(r)$$

In this example, F may represent a function (e.g., a linear function, a non-linear function, a custom algorithm, etc.), y is an evaluation result for a candidate, and r is a vector of ratings determined from historical data, r having a length ranging from 1 to n, where n is the total number of questions in the evaluation. The function F may handle a dynamic vector length, so that an evaluation result prediction may be calculated as additional ratings are entered by an evaluator. Given a sufficient quantity of y and r data, the function F may be modeled to enable the prediction of a y from a given r. The predictive model may be provided by the digital evaluation platform 110 or by other components.

One specific example of the function F may be expressed by:

$$F(r)=\beta *r$$

where β can be solved by:

$$\beta=(X'X)^{-1}Xy$$

where X is the binary matrix above and y is the competency score index above. The output (β) represents each competencies impact on the overall outcome of the candidate. Once this is determined, the model is trained for use on future candidates. The prediction for a new candidate, j, who has just completed an evaluation, may be:

$$y_{pj}=\beta x_j$$

where $x_j$ is a row vector of all of the competency input for candidate j assigned by the evaluators and $y_{jp}$ is the predicted achievement index using model β trained from historical data. This can add further insight to the evaluator decisions on which candidates have the most potential against the desired achievement index.

A second example of the function F may be expressed by an ensemble approach such as gradient boosted regression, where F is expressed by:

$$F(r)=\Sigma_{b=1}^{B}\lambda f^b(r)$$

where λ defines the influence from the previous decision tree models and should be considered to be the learning rate. A smaller learning rate requires a higher number of total boosts, B, and therefore more decision trees to be trained. This can increase the accuracy but at a higher cost of training and model evaluation. The sub functions $f^b$ are individual decision trees which are fitted to the remaining residual with a tree depth of b. To train this model, the individual models are trained towards the remaining error and these individual error models are then added together to give a final prediction.

A third example of F is that of a Bayesian approach where previous outcomes are used to create naïve probabilities of future outcomes, also known as Naïve Bayesian techniques. Here, F is defined by:

$$F(r\mid Y=y)=\frac{P(Y=y\mid R=r)F(r)}{P(Y=y)}$$

where the probability of Y being equal to y based on features x is equal to the historical probabilities being combined using the Bayes Theorem shown above. The function P is simply the historical probability of the input constraint (i.e. Y=y, X=x).

Other embodiments may provide other calculation and assessment. For example, the scores used to determine decisiveness may be normalized for use with other algorithms. The normalized value of the score or rating may be reported between 0 and 1, after normalization as seen below:

$$rating_n=rating/gradingScale$$

where the gradingScale represents the maximum available score. For example, where a scoring or rating scale of 1-5 is used, the gradingScale would be 5. If a candidate receives a rating of 3 on a gradingScale of 5, the normalized rating would be 0.6

To determine the decisiveness of a question a ratings matrix R may be assembled, wherein each row of the matrix include the ratings vector r from the evaluation of a candidate. For example, such a ratings matrix R may be as shown below:

$$R=\begin{bmatrix} 0.2 & 0.4 & \ldots & 0.6 \\ 0.9 & 0.6 & \ldots & 1.0 \\ \vdots & \vdots & \ddots & \vdots \\ 0.1 & 0.5 & \ldots & 0.3 \end{bmatrix}$$

Each column of R may correspond to a different question prompt used within a position sector being analyzed. Where a given question prompt being analyzed was not used in a particular evaluation campaign, a row corresponding to a candidate evaluated in that particular campaign may use a value of zero as the rating for that given question prompt in the ratings vector r. The ratings matrix R may be a sparse matrix.

To determine a measure of decisiveness the ratings matrix R may be split into two portions, one with high ratings and another with low ratings. A threshold may be used to sort the ratings from R into the two matrices. For example, ratings below a threshold of 0.5 may be placed into the low matrix, while ratings equal to or greater than 0.5 may be placed into a high matrix as shown below. Additionally, a value of 1 may be subtracted from the non-zero ratings in the low ratings matrix as show below, to create a positive ratings matrix component $R_{pos}$ and a negative ratings matrix component $R_{neg}$.

$$R_{split}=R_{neg}\mid R_{pos}$$

which may simplify to:

$$R_{split}=\begin{bmatrix} -0.8 & -0.6 & \ldots & 0 & \mid & 0 & 0 & \ldots & 0.9 \\ 0 & 0 & \ldots & 0 & \mid & 0.9 & 0.6 & \ldots & 1.0 \\ \vdots & \vdots & \ddots & \vdots & \mid & \vdots & \vdots & \ddots & \vdots \\ -0.9 & -0.5 & \ldots & -0.7 & \mid & 0 & 0.5 & \ldots & 0 \end{bmatrix}$$

Once the split ratings matrix $R_{split}$ is formulated as shown above, then a system identification algorithm may be applied, such as support vector machines, decision-trees, symbolic regressions using genetic programming, neural networks, or others. For example, a non-negative least squares constrained algorithm may be used to produce a vector of corresponding weights β, where each question has a weight for negative scoring and positive scoring.

To further illustrate the use of the ratings matrix $R_{split}$, an exemplary evaluation result matrix may be provided. In this evaluation result matrix, a single metric is used: the evaluation decision of candidates. For example, candidates in an evaluation campaign may receive categorical decision results of "yes," "no," and "may be," which may be mapped to numerical representations as shown below:

$$Y = \begin{bmatrix} y_1 \\ y_2 \\ \vdots \\ y_n \end{bmatrix} = \begin{bmatrix} yes \\ no \\ \vdots \\ maybe \end{bmatrix} = \begin{bmatrix} 3 \\ 1 \\ \vdots \\ 2 \end{bmatrix}$$

In other embodiments, other metrics may be used in place of the evaluation result matrix, including multiple metrics. For example, an achievement index as described above may be used. Additionally, the numerical mapping may be a different mapping that provides a different weighting between results or other metrics. Using the $R_{split}$ and Y data sets, a predictive model may be constructed to predict the evaluation result, y, given an input ratings matrix R. Many different types of predictive model options may be used to predict question impact, influence, or decisiveness, including regression, neural networks, support vector machines, decision trains, Markov model variants, and others.

As an example, a constrained positive least squares system identification may be used to obtain a model as shown below:

$$\beta = \text{lsqnonneg}(R, Y)$$

where β is defined by solving the linear system, a least squares non-negative algorithm in this case, for the smallest residual where all values of β remain positive. When β is solved for, the negative scoring β values can be combined with the positive scoring β values to determine prompt decisiveness. Several decisiveness metrics may be available from these β values. For example, decisiveness may be defined as shown below:

$$\text{Decisiveness} = \frac{\beta(1:n)}{\text{No}} + \frac{\beta(n+1:\text{end})}{\text{Yes}} = \frac{\beta(1:n)}{1} + \frac{\beta(n+1:\text{end})}{3}$$

Here, β(1:n) represents all of the coefficients of the negative ratings, and β(n+1:end) represents all of the coefficients for positive ratings. The values in each β are shown as normalized by the decision result with which they are associated. The negative values of β are normalized by 1, because "no" was mapped to 1, while the positive values of β are normalized by 3, since "yes" is mapped to 3.

In conjunction with a determination of impact or decisiveness, in some examples, the questions may be clustered based on similarity. Similarity determinations such as Levenshtein similarity, number of edits to make same, word weighting, or other similarity calculations or schemes.

Once the model or predictive function is trained and the questions and competencies are validated as effective and ranked by impact, the system described herein becomes a powerful and effective tool for reducing the amount of time and resources that would otherwise be spent developing an interview and conducting studies and field tests to identify competencies and question sets that may or may not produce an actual effect on the candidate field.

The client computing systems 102 (also referred to herein as "clients 102" or "client 102") may each be a client workstation, a server, a computer, a portable electronic device, an entertainment system configured to communicate over a network, such as a set-top box, a digital receiver, a digital television, a mobile phone, a smart phone, a tablet, or other electronic devices. For example, portable electronic devices may include, but are not limited to, cellular phones, portable gaming systems, wearable computing devices or the like. The client 102 may have access to the Internet via a firewall, a router or other packet switching devices. The clients 102 may connect to the server 104 through one or more intervening devices, such as routers, gateways, or other devices. The clients 102 are variously configured with different functionality and may include a browser 120, one or more applications 122, and an interface 124 such as a graphical user interface (GUI). The clients 102 may include a microphone and a video camera to record detected inputs as digital data. For example, the clients 102 may record and store video responses and/or stream or upload the recorded responses to the server 104 for capture and storage. In one embodiment, the clients 102 may interact with the interface 124 to access the digital evaluation platform 101 via the browser 120 to record responses. Some recorded responses may include audio, video, code or text, other work samples, and/or combinations thereof. In such embodiments, the digital evaluation platform 101 is a web-based application or a cloud computing system that presents the interfaces 124 to the client 102 via the browser 120.

Similarly, one of the applications 122 can be used to access the digital evaluation platform 101. For example, a mobile application (referred to as "app") can be used to access one or more user interfaces of the digital evaluation platform 101. The digital evaluation platform 101 can be one or more software products that facilitate the digital evaluation process. For example, in some cases, the client 102 is used by a candidate (or interviewee) during a digital interview. The digital evaluation platform 101 can organize the digital interview using competency data 132 corresponding to the interview as well as questions data 134. The competency data may be stored in a data store 130. The competency data 132 may include information relating to specific characteristics or qualities of candidates that may be relevant to the position for which the candidate is to be evaluated. As illustrated herein, the competency data 132 may include potential competencies that may be used to evaluate the candidate. For example, some of the potential competencies may include drive, dedication, creativity, motivation, communication skills, teamwork, energy, enthusiasm, determination, reliability, honesty, integrity, intelligence, pride, dedication, analytical skills, listening skills, achievement profile, efficiency, economy, procedural awareness, opinion, emotional intelligence, etc.

The question data 134 may also be stored in the data store 130. In some examples, the question data 134 may include a database of questions for use in evaluating candidates. In some examples, the questions may be pooled from various sources such as databases belonging to various entities. The question data 134 may include questions created by users, questions generated by automated systems, or partial questions or questions suggestions for building custom questions. As described above, the question data 134 may include validated questions that have been analyzed and proved as effective. The question data 134 may also include unvalidated questions. In some examples, the unvalidated questions may be questions that have not been analyzed and proven. In another example, unvalidated questions may be questions which have not been used for a certain period of time. In another example, unvalidated questions may be questions that have not been determined to have an effect above a certain threshold. Other criteria may be used to classify a question as unvalidated. In some examples, the question data 134 may include markers or another form of identifier to indicate the type, status, nature, or characteristic of the data.

The clients 102 can also be used by an evaluation campaign manager to create and manage one or more evaluation campaigns and to review, screen, and select candidates and their associated response data. For example, the evaluation campaign manager may be an agent or member of a human resources division of a company that has one or more open positions to fill using the digital evaluation platform 101. As another example, the evaluation campaign manager may be a venture capital or private equity investor receiving investment pitches through the digital evaluation platform 101. The campaign manager can access the digital evaluation platform 101 via the browser 120 or the application 122 using the interface 124 as described above. In some embodiments, the application 122 may provide at least some of the features described herein in connection with the digital evaluation platform 101. For example, the application 122 may provide the interview design program 110, when a campaign manager uses the client 102. In some examples, the user interfaces 124 presented to the campaign manager by the digital evaluation platform 101 are different from the user interfaces presented to the candidates. The user interfaces 124 presented to the campaign manager may allow for selecting and/or entering one or more competencies, questions, or prompts to be presented to candidates in the evaluation process. The user interfaces 124 may also permit the campaign manager or others working with the campaign manager to select competencies, select questions, review responses, and select the candidates.

The clients 102 may also be used by other reviewers or evaluators who are not authorized to create and manage evaluation campaigns, but may review, screen, and select candidates by accessing their associated responses. The evaluators may provide ratings of the responses and may also provide evaluation decisions or recommendations to more senior evaluators or to the campaign manager.

As illustrated in FIG. 1, the data store 130 may represent one or more data repositories on one or more memory devices. The data store 130 may be a database or any other organized collection of data. The data store 130 may be a local storage, a network attached storage, a distributed storage system, or other type or organization of storage for storing data.

The data store 130 may store the competency data 132, question data 134, impact data 138, results data 140, and achievement data 142 for a single campaign as well as data for multiple campaigns. As shown in FIG. 1, the data store 130 includes data for competencies 132 and questions 134 which can be automatically or manually incorporated into a digital interview by the interview design program 110. The data store 130 also includes impact data 138, results data 140, and achievement data 142. The impact data 138 may include information relating to competencies and questions. For example, the impact data 138 may provide a value describing the amount of impact a competency or question has been determined to have on past interview outcomes. Additionally, the impact data 138 may include a prediction of a potential impact of a competency or question on a current interview being assembled by a client 102. The results data 140 may include information describing the results of previous interviews. This information may be used by the digital evaluation platform 101 to determine which questions have impacted the outcome of previous interviews. The competency analyzer 112 may access the results data 140 to determine whether or not a competency or group of competencies should be validated as effective. Similarly, the question analyzer may access the results data 140 to determine if a question or group of questions should be validated with respect to a competency or candidate. In one example, the results data 140 may include scores for previous candidates or campaigns. The scores may be organized by competency, question, candidate, or some other scheme. The results data 140 may include the binary matrix and the score index described above as well as other structures and systems for organizing and tracking the results data 140. The results data 140 may also store the responses from a candidate to a current interview prior to or after review. In some examples, the entity reviewing the responses of the candidate may make annotations or flag certain portions of the responses stored in the results data 140.

The illustrated example of the data store 130 also includes achievement data 142. In some examples, the achievement data 142 may include data corresponding to a performance of a candidate. For example, a candidate may apply for a position and state previous accomplishments such as sales numbers with a previous employer, education information such as degree, courses, and grades, awards received, and other accomplishments prior to taking the digital interview. The digital interview may then be administered and the score received by the candidate may be stored in the achievement data 142. After being hired, the achievement data 142 may be updated to reflect a successful hiring. The candidate may go on to create additional data points with performance at the candidate's new position. This may include new sales number, trainings, awards, promotions, and other metrics or events. These pieces of information may be stored to the achievement data 142 of the data store 130 for reference in building future digital interviews as described herein.

The data store 130 may also include a collection of potential positions for which a digital interview may be built. The data store 130 may also include descriptions of the position or opportunity associated with the interview, settings of the digital evaluation platform 101 to be applied to each interview, etc.

In the data store 130, the various kinds of data may be accessed in a number of different ways. For example, data may be aggregated and presented by the digital evaluation platform 101 by campaign, by candidate, by the organization sponsoring a campaign. Additionally, restrictions may be placed on one or more types of data, such that one company cannot access data associated with another company.

In the depicted embodiment, the server computing system 104 may execute the digital evaluation platform 101, including the interview design program 110 for facilitating analyzing competencies and questions to determine an association effectiveness of a competency or question with relation to a position, build a digital interview based on the competencies and questions, administer the digital interview, predict a fit of a candidate based on a result of a digital interview, and update the data in the data store 130 based on an outcome of the administered interview.

The server 104 may include web server functionality that facilitates communication between the clients 102, the digital evaluation platform 101, and the data store 130 to conduct digital evaluation as part of an evaluation campaign. This communication allows individuals to review evaluations such as digital interviews, manage ongoing evaluation campaigns, and create new campaigns. Alternatively, the web server functionality may be implemented on a machine other than the machine running the interview design program 110. It should also be noted that the functionality of the digital evaluation platform 101 to record digital response data can be implemented on one or more servers 104. In other embodiments, the network architecture 100 may include other devices, such as directory servers, website servers, statistic servers, devices of a network infrastructure operator (e.g., an ISP), or the like. The network architecture 100 may provide different levels of access for different users. For example, an agent operating the interview design program may have a higher level of access while a candidate to whom the evaluation is administered may have more restricted access. Those reviewing the candidates after completion of the evaluations may have another level of access. These various levels of access may be associated with access to different subsystems or functionality within the network architecture 100. Alternatively, other configurations are possible as would be appreciated by one of ordinary skill in the art having the benefit of this disclosure. For example, the functions, as set forth above with respect to FIG. 1 may be performed by other digital evaluation platforms in other configurations and other computing environments such as distributed networks, cloud computing networks, etc. Further, the evaluation platform 101 may be a hosted service accessible via a variety of portals, browsers, virtual interfaces, or other applications on a client device. Other embodiments may provide other functionality.

Figure 2:
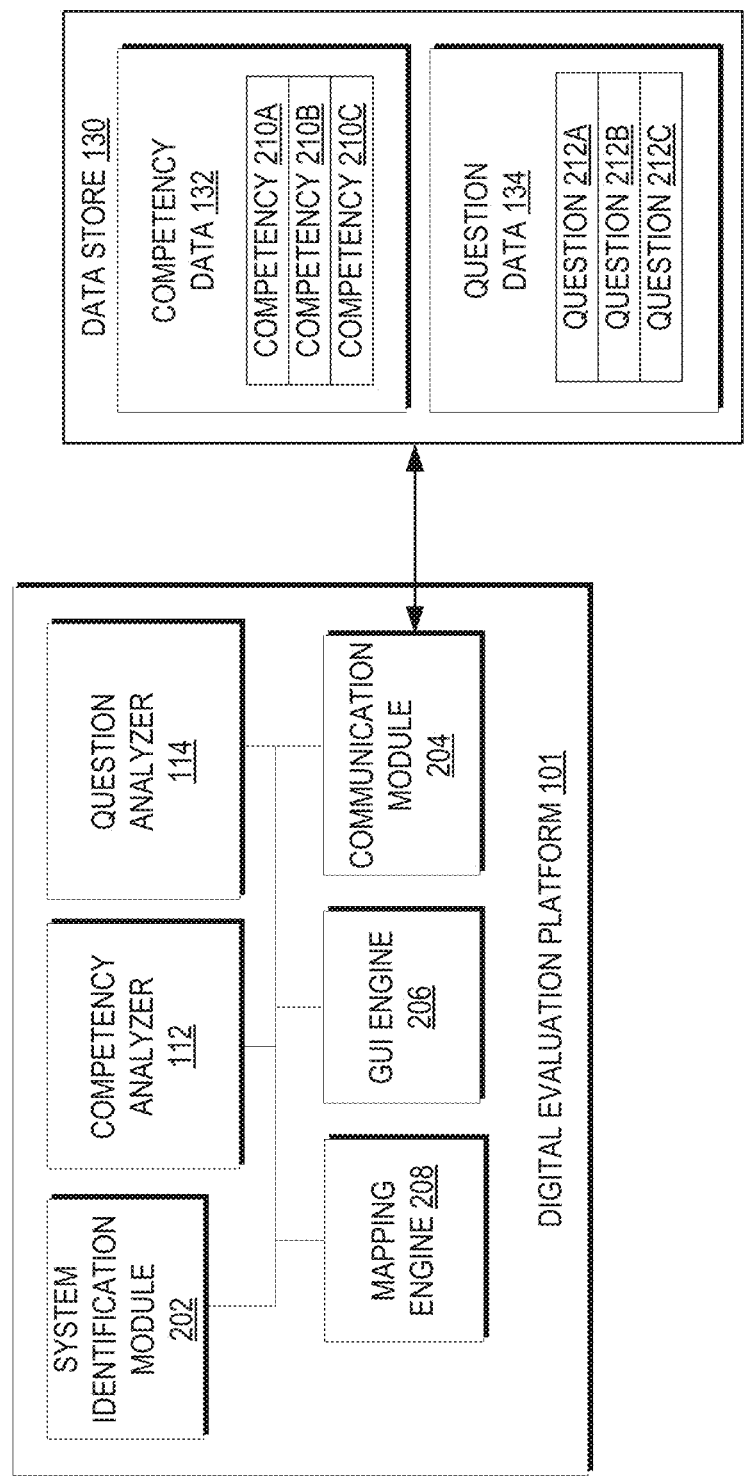
FIG. 2 is a block diagram of a digital evaluation platform according to one embodiment.

FIG. 2 is a block diagram of a digital evaluation platform 101 according to one embodiment. The digital evaluation platform 101 can be implemented as processing logic comprising hardware (circuitry, dedicated logic, etc.), software (such as is run on a computing system or a dedicated machine), firmware (embedded software), or any combination thereof. In the depicted embodiment, the interview design program 110 includes a system identification module 202 for machine learning and building predictive models, the competency analyzer 112, the question analyzer 114, a communication module 204, a graphical user interface (GUI) engine 206, and a mapping engine 208. The components of the digital evaluation platform 101 may represent modules that can be combined together or separated into further modules, according to some embodiments.

As illustrated in FIG. 2, the system identification module 202 may receive evaluation data, including competencies and questions with associated validations, ratings and evaluation results, to model how effective a competency or question is at splitting a group of candidates with respect to the result of an evaluation. For example, based on historical data for a given position, a group of competencies and associated questions may be identified as most closely correlated with the evaluation decisions (e.g., who is offered the position and who is not). A larger data set, such as may be obtained by combining multiple data sets, may enable the system identification module 202 to provide better models for use in building digital interviews for a position and evaluating candidates. The communication module 204 may enable the digital evaluation platform 101 to communicate with the data store 130 to permit the mapping engine 208 to organize the data in the data store 130 to reflect this association. For examples, the mapping engine 208 may map a specific competency to a position. The mapping engine 208 may further map one or more questions to the competency or directly to the position. As illustrated in FIG. 2, the competency data 132 may include specific competencies 210 A-C. Each of these competencies 210 may be mapped to one or more positions or position descriptions stored in the data store 130. Similarly, the question data 134 may include questions 212 A-C. Each question 212 may be mapped, by the mapping engine 208 to a specific competency 210 based on a model analyzing historical data or user input. In some examples, a question 212 may be mapped to multiple competencies 210. The data store 130 may include additional data associated with each competency 210 and each question 212 identifying the data as validate or unvalidated.

A competency may be validated for a position by analyzing, by the competency analyzer 112 the impact of the competency on a digital interview. The competency analyzer 112 may label the competency as validated upon determining that the competency was impactful in splitting a candidate field. Similarly, questions may be validated by the question analyzer 114 upon a determination that a question, within a competency, was effective at distinguishing one candidate over another. Other schemes for validating competencies/questions may be incorporated.

Figure 6:
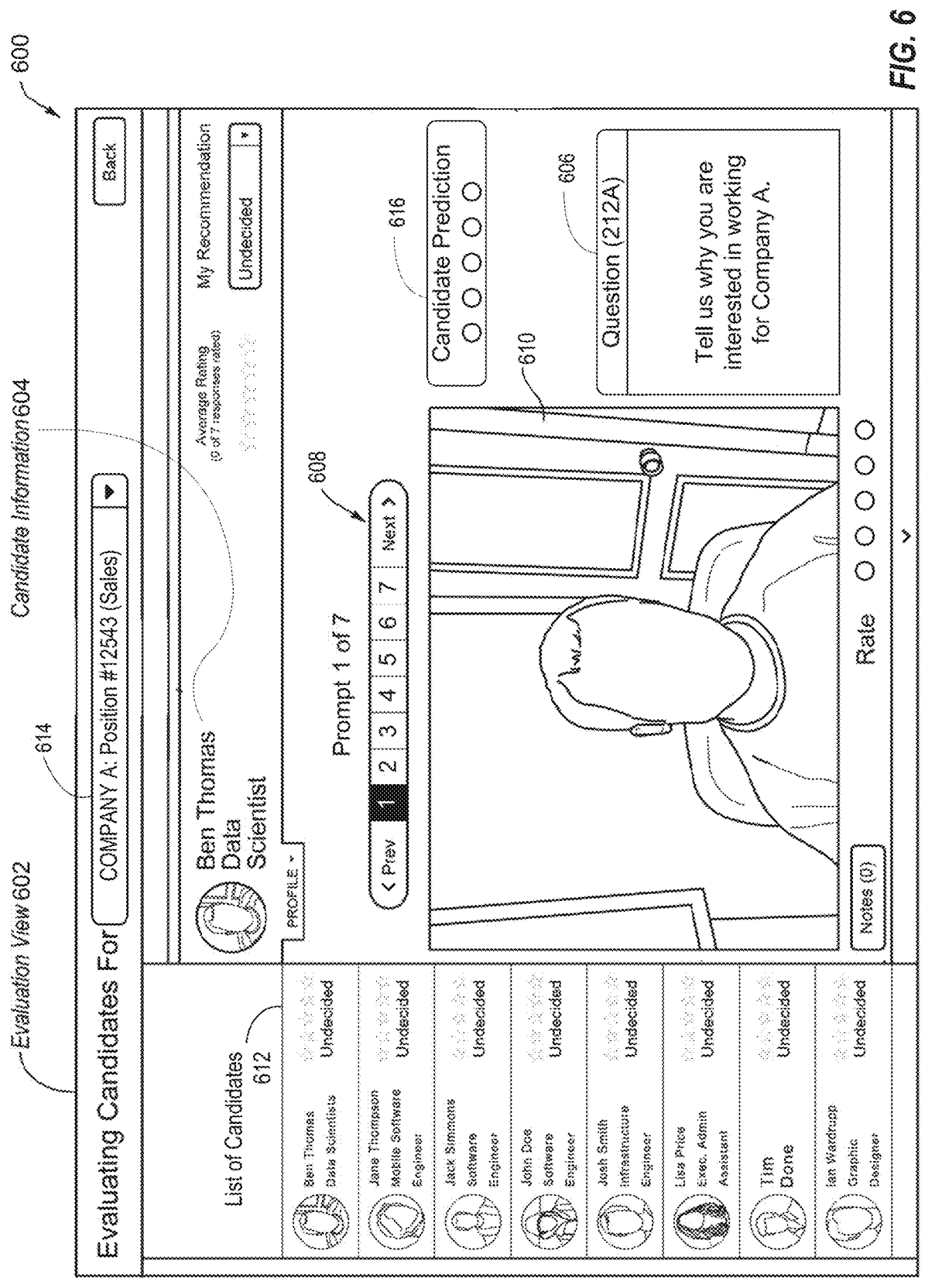

The GUI engine 206 may facilitate the generation and management of user interfaces for management of the data store, training models using historical data, validating questions and competencies, mapping competencies and questions, building an interview, administering an interview, reviewing an interview, predicting a candidate viability, and updating the data store 130. An example of one embodiment of a graphical user interface, which may be provided by the GUI engine 206 for the digital evaluation platform 101, is illustrated in FIG. 6 and described in further detail below. In some examples, the digital evaluation platform 101 may provide information to an agent to display an interface, such as a webpage, for building the digital interview or evaluation. The webpage may be an interactive webpage or the like. The GUI engine 206 may provide various input mechanisms to facilitate interaction of the agent with the information displayed to the agent. For example, the input mechanisms may include interactive buttons, text fields, indicators, display panels, menus, etc. In one case, the agent may enter a string to a text field for the position for which the company is seeking candidates. The interface may alternatively provide a menu for selection of built-in positions. The interface may also provide a list of competencies determined to be associated with the selected position. The agent may be prompted to select the desired competencies by selecting radio buttons, highlighting, dragging and dropping, or otherwise selecting the desired competencies. Similarly, the agent may be prompted to select from a list of questions associated with the competencies in like manner. The interface may show a visual association of the position to the competencies and the corresponding questions as the agent makes the selections. This may appear as a tree chart or other visual representation communicating the associations. The interface may provide the ability to modify selections, restart the process, re-determine a competency or question based on further input, or otherwise provide additional input. At this point, GUI engine 206 may also allow the agent to select a configuration for the interface through which the candidates will complete the evaluation. The agent may manipulate the interface to include more or less information and context. Other features and functionality may be provided to the agent to further modify or establish the evaluation interface and corresponding operation.

Figure 3:
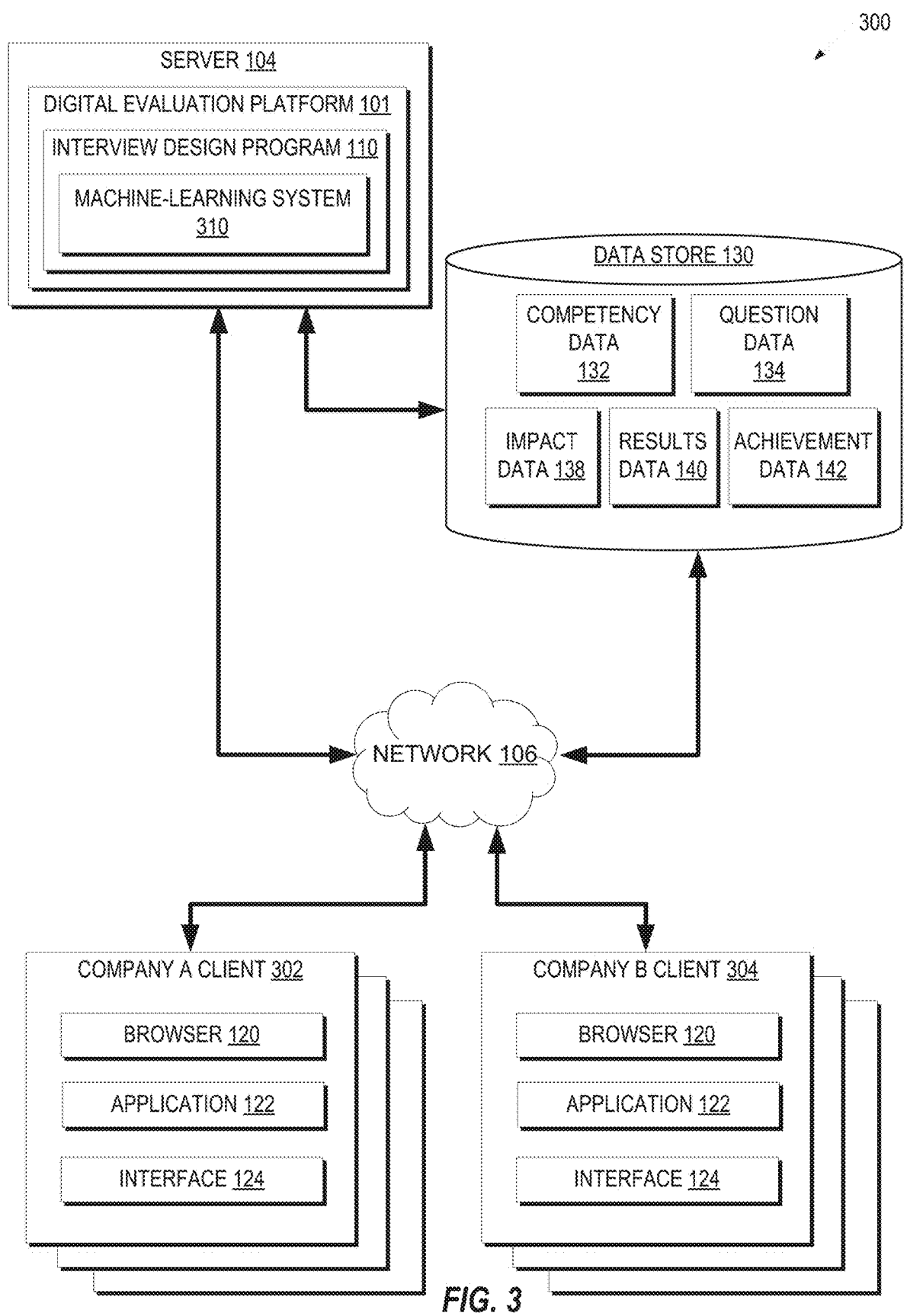
FIG. 3 is a block diagram of an exemplary network architecture in which some embodiments of an interview design program may operate.

FIG. 3 is a block diagram of an exemplary network architecture 300 in which embodiments of an interview design program 110 may operate. In the illustrated example, the server 104, the data store 130, a company A client 302, and a company B client 304 are connected to the network 106 as described above. As an example, assume that Company A would like to fill a sales position. An agent, or other person who uses the digital interview platform to create or modify a digital evaluation for particular competencies, may act on behalf of Company A. This agent or operator may access the network 106 and connect to the interview design program 110 to build an interview to screen potential candidates. The agent may interface with the interview design program 110 through the browser 120, application 122, and interface 124 on the company A client 302. In one example, the agent may sit down and enter a position into the interface 124 for which Company A is seeking candidates. The position is communicated over the network to the interview design program 110 hosted by the digital evaluation platform 101 on the server 104. The interview design program 110 may compare the position to positions stored in the data store 130 relative to the competency data 132 and question data 134. The interview design program 110 may include a model 310 determine a corresponding position within the data store 130 and then correlate the position to a list of potential competencies. In one example, the model 310 may have associated the position and the list of potential competencies based on a machined learned association from historical data from past digital interviews. For example, the model 310 may employ the competency matrix, achievement score index, binary matrix, and competency score index described above. Based on this information, the model 310 may provide the list of potential competencies to the interview design program 110. In turn, the interview design program 110 may return the list of potential competencies to the company A client 302 for review by the agent on the interface 124. After reviewing the list of potential competencies, the agent may select all or a subset of the list of potential competencies and submit the selected set of desired competencies to the interview design program 110. In one example, the agent may also manually enter a specific competency to be added to the set of desired competencies. Other options, such as viewing the competencies in an order of importance determined by the model 310, editing the desired competencies, manually ordering the competencies by importance, or other functions may be made available to the agent via the interface 124.

The interview design program 110 receives the selection of desired competencies and the model 310 determines a list of questions based on the selected competencies. In one example, the model 310 of the interview design program 110 may rank the list of questions based on the impact of the questions in the historical data. The ranking of the questions may also take in the specific combination of competencies selected by the agent. The list of questions is sent back to the agent at the company A client 302 for review. The agent then reviews the questions and approves or disapproves of each question or group of questions.

Once the agent has made a selection of a set of desired questions, the interview design program 110 may build the digital interview and submit the digital interview to the agent. In one example, the agent may have an opportunity to review and edit the digital interview. In some embodiments, the interview design program 110 may provide a special interface 124 to the agent to allow for a graphical presentation of the components of the interview. For example, the interview design program 110 may allow the agent to view how the competencies and incorporated questions are grouped within the structure of the digital interview. The agent may elect to scramble the questions throughout the duration of the interview or present the questions by competency or rank. Other functionality and features may be incorporated to allow the agent to review, revise, and approve or rejection the digital interview.

The digital evaluation platform 101 may then make the digital interview available for distribution to potential candidates. This may be via hyperlink, sending a file to the agent, providing access credentials, etc. Upon access by a candidate, the digital evaluation platform 101 may administer the digital interview to the candidate and store responses and data to the data store 130.

Upon completion of the digital interview by the candidate, the digital evaluation platform 101 may then apply the model 310 to compare the responses of the candidate to the historical data for each question and/or competency to predict a fitness of the candidate for the position supplied by the agent. This prediction may be sent to the agent or made available over the network 106. A decision by Company A to hire a candidate may also be received and used to update one or more of the competency data 132, the question data 134, the impact data 138, the results data 140, and the achievement data 142. The updated data may then be used by the model to reassess the competencies and questions to re-rank and reorganize the competencies and questions to improve the effectiveness of future interviews.

Although specific steps and details are described above, some embodiments may include fewer or more details and functionality. For example, the interview design program 110 may provide a fully automated operation by taking in the position specified by the agent and returning the completed interview. In this example, the interview design program 110 does not request selection and additional input from the agent on competencies and questions before creating and returning the digital interview to the agent. In other embodiments, other steps and functionality may be included.

Figure 4:
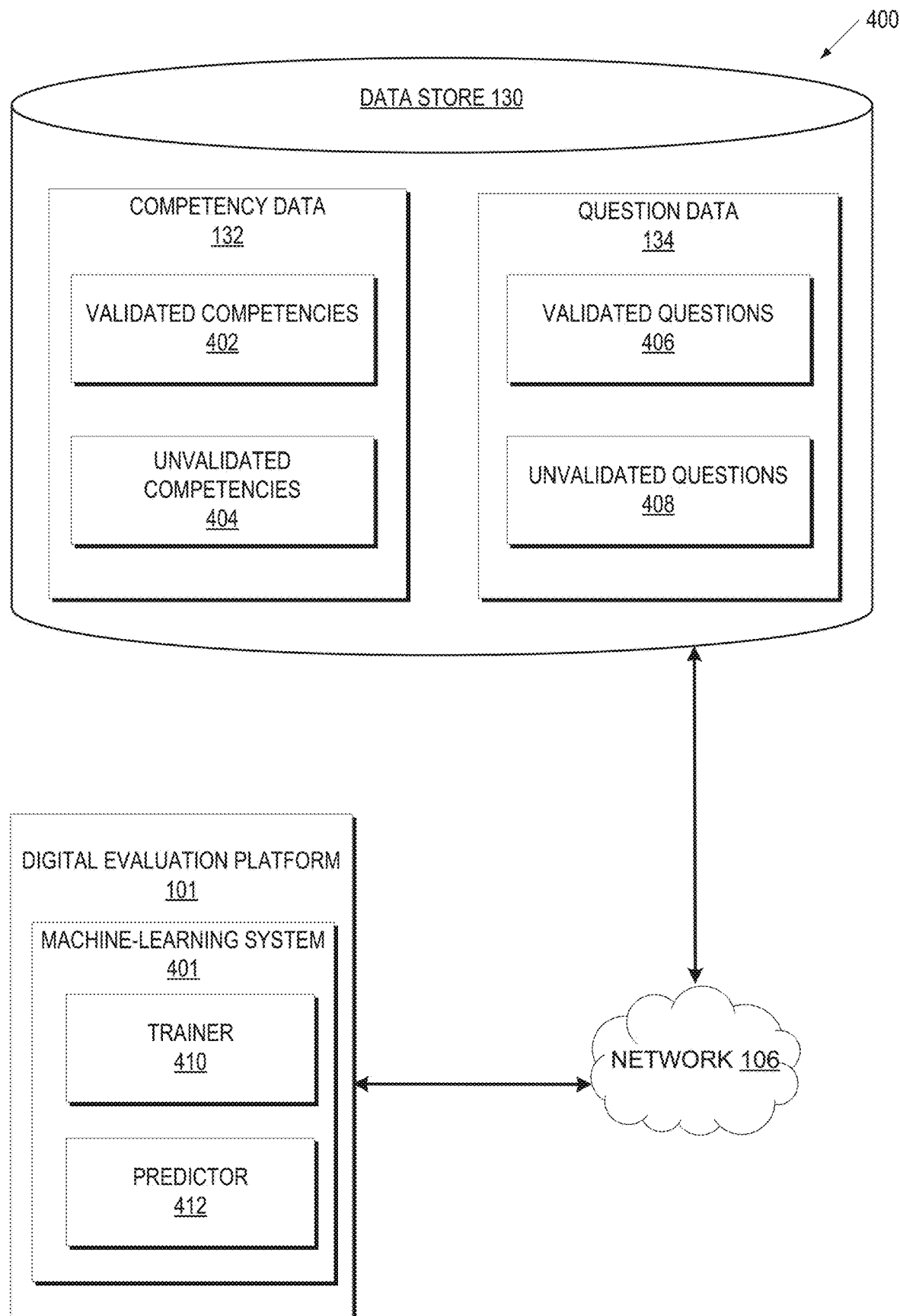
FIG. 4 is a block diagram of an exemplary network architecture in which some embodiments of a model of a digital evaluation platform may operate.

FIG. 4 is a block diagram of an exemplary network architecture 400 in which embodiments of a machine-learning system 401 of a digital evaluation platform 101 may operate. In the illustrated embodiment, the machine-learning system 401 may implement a predictive function or model. The machine-learning system 401 solves the predictive function using historical data as a training set and, once trained or solved, applies the predictive function to the current data.

In the illustrated embodiment, the machine-learning system 401 may include a trainer 410 and a predictor 412. The trainer 410 may access the data store 130 to analyze historical competency data 132 and question data 134. The trainer 410 may use machine-learning algorithms and schemes such as support vector methods, regression algorithms, neural networks, tree-structured classifiers, and ensemble techniques to identify connections and trends in the data to solve the predictive function or model. Once completed with an initial training of the model, the trainer 410 of the machine-learning system 401 then provides the ability to update the solution to the predictive function upon receipt or detection of new data or changes in the historical data.

The predictor 412 facilitates analysis of responses by candidates in current digital interview campaigns to predict a fit of the candidate for a position based on the result for previous candidates with respect to the previous responses.

The predictor 412 may also analyze the competency data 132 and question data 134 to determine a validation state of the data. For example, a new competency may be submitted to the data store 130. The new competency may be stored as an unvalidated competency 404 initially. Once the competency has been incorporated into an interview and data collected on the effectiveness and viability of the competency, the predictor 412 may change the status of the new competency from unvalidated to validated. The now validated competency may be assigned a ranking based on the impact of the competency on an interview outcome. Similarly, a new question may begin as an unvalidated question until data is collected on the question at which point the question may be designated as a validated question.

Figure 5:
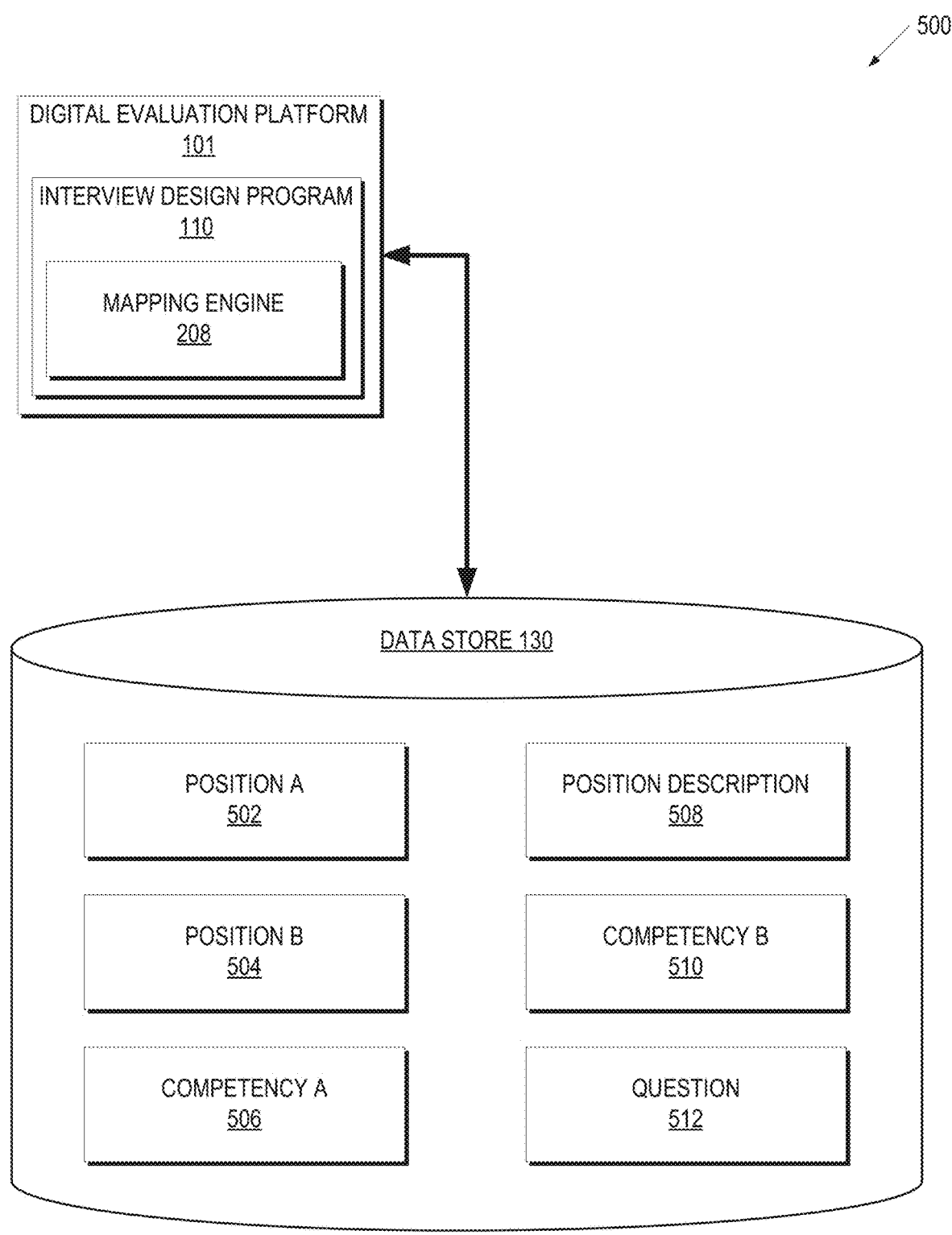
FIG. 5 is a block diagram of an exemplary network architecture in which some embodiments of a mapping engine of a digital evaluation platform may operate.

FIG. 5 is a block diagram of an exemplary network architecture 500 in which embodiments of a mapping engine 208 of an interview design program 110 of a digital evaluation platform 101 may operate. In the illustrated embodiment, the interview design program 110 includes a mapping engine 208. The mapping engine 208 may connect to the data store 130 to organize the data therein. In one example, the mapping engine 208 may analyze position A 502 and determine that position A 502 corresponds with position description 508. This may be based on a textual analysis or based on historical data that shows a similarity between the two. Further, the mapping engine 208 may determine that position B 504 is frequently associated with competency B 510. For example, position B 504 may be a sales position and competency B 510 may be "motivation." Based on the frequency of association, the mapping engine 208 may map competency B 510 to position B 504. The Mapping engine 208 may also create multiple mapping connections for a single element within the data store 130. For example, the mapping engine 208 may determine that the question 512 was previously useful to a client as determining the fitness of a candidate within competency A 506 as well as competency B 510. Accordingly, the question 512 may be mapped to both competency A 506 and competency B for the purposes of building a digital interview, predicting an outcome on an interview, and validation of questions and competencies. Other embodiments may include fewer or more features for the mapping engine 208 which may provide fewer or more functions.

FIG. 6 is an exemplary graphical user interface 600 for building and reviewing digital interviews according to one embodiment. The illustrated embodiment is one example of an interface which may be used for building an interview, predicting an outcome for a candidate, and for viewing recorded responses and other information obtained in an interview. The user interface 600 may be an evaluation view 602 of a digital evaluation platform 101. The evaluation view 602 includes candidate information 604, a prompt element 606, a response navigation element 608, a media panel 610, and a list of candidates 612 that have been or have yet to be evaluated as part of an evaluation campaign. The evaluation view 602 of the user interface 600 also includes an interview information element 614 that displays information regarding the interview and permits the campaign manager to select among candidates. The interview information element 614 may include information regarding a sponsor of the campaign and information regarding the position the candidate is intended to fill.

As described above, the GUI 600 of FIG. 6 may be designed by the agent via the interview design program. The agent may enter a position for which the company is seeking candidates and select from list of potential position matches. The potential position matches may include descriptions to provide further context and specificity for the agent building the interview. The agent may then select from a list of competencies associated with the selected position. The interface may present a list of questions corresponding to the competencies that the agent has selected. The agent may select or modify the list of questions. For example, the agent may rewrite one of the presented questions of submit a new question. The agent may designate a competency to which the evaluation platform may add the new question. Alternatively, the interview design program may analyze the question and assign it to a competency. Further in the alternative, the question may remain unassigned until after the evaluation is complete and the results may be analyzed.

The agent may also elect to include a designation which communicates the competency being tested. This may be communicated to the candidate and/or communicated to the reviewer who analyzes the candidates' responses. In one embodiment, the reviewer may be presented with a candidate prediction element 616 which provides an indication of a preliminary prediction of the viability of the candidate for the position based on historical data. The prediction may be presented for the specific question being reviewed or for a general fit of the candidate based on all responses.

The evaluation view 602 also displays information associated with the digital interview builder or offeror of the position. For example, this depicted interview is a campaign managed by "Company A" for a position in sales. The illustrated example includes data stored in the data store 130, such as questions from competencies 210A, 210B, and 210C, as shown in FIG. 2. In the evaluation view 602 question 212A is displayed in the prompt element 306. The media panel 610 may display an example of a recorded video response of the candidate during interview building or an actual recorded response from "Ben Thomas" to the question 212A, shown in the prompt element 606.

Figure 7:
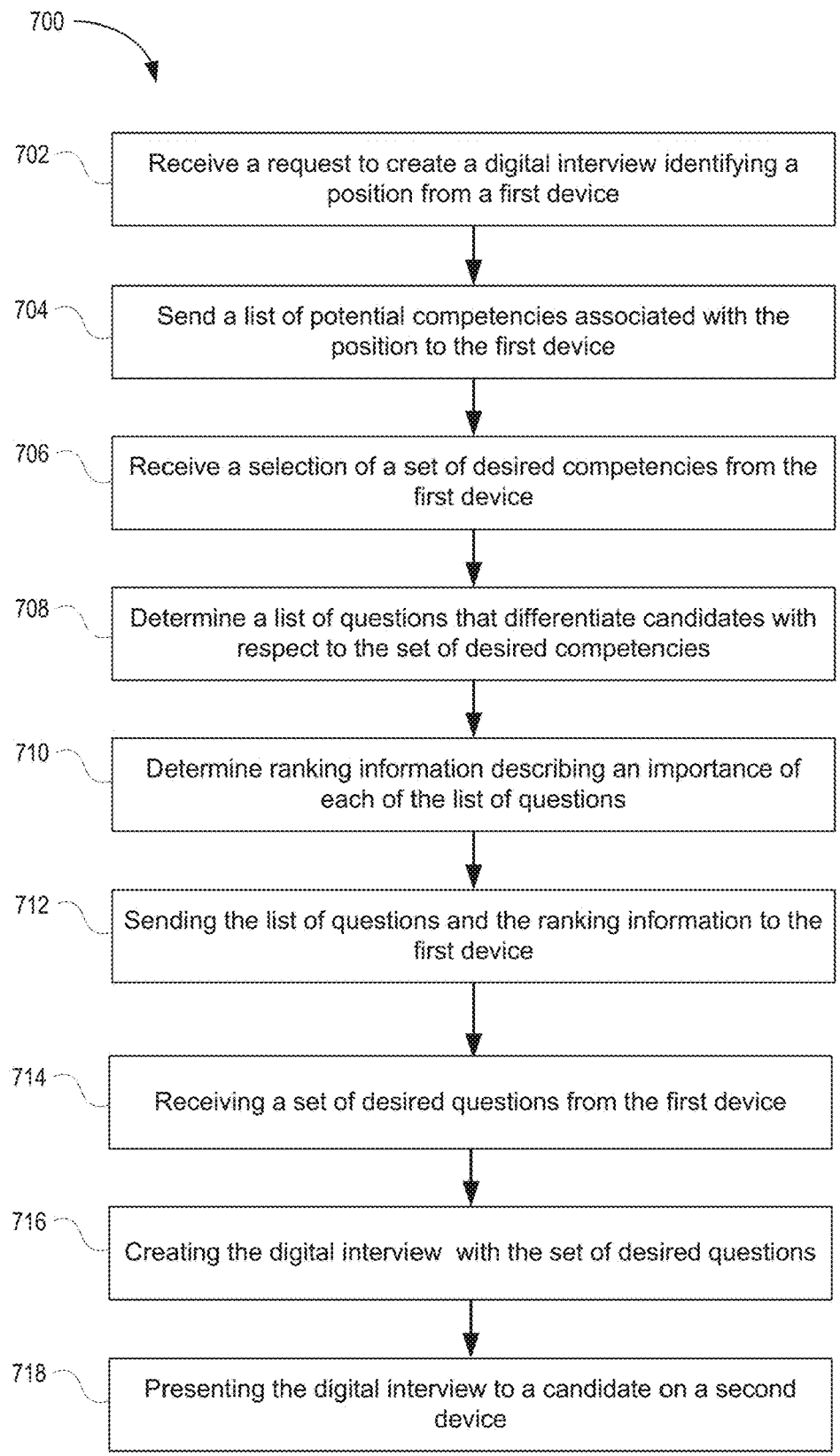
FIG. 7 is a flow chart of a method of building a digital interview according to an embodiment.

FIG. 7 is a flow chart of a method 700 of building a digital interview according to an embodiment. Embodiments of the method 700 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the method 700 and other methods of this disclosure may be depicted and described as a series of acts or operations. However, operations in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on a non-transitory, tangible, computer-readable medium to facilitate transporting and transferring such methods to computing devices.

Embodiments of the method 700 may begin at block 702, at which processing logic of the interview design program receives a request to create a digital interview. The request identifies a position and originates from a first device. For example, the processing logic of the digital evaluation platform 101 may receive the request over the network 106, via an application 122 or browser 120 from a client 102 operating on the first device.

At block 704, the processing logic sends a list of potential competencies associated with the position to the first device.

For example, the digital evaluation platform 101 may use the model 310 to select competencies 210 from the competency data 132 and provide them to the client 102.

At block 706, the processing logic may receive a selection of a set of desired competencies from the first device. For example, the digital evaluation platform 101 may receive an indication from the client to select competencies 210A and 210B for the digital interview.

At block 708, the processing logic determines a list of questions that differentiate candidates with respect to the set of desired competencies. For example, the interview design program 110 may select questions 212 which are mapped to competencies 210A and 210B. The interview design program 110 may select questions 212 based on a determination by the mapping engine 208 that the questions 212 correspond to the competencies 210A and B and a determination, by the model 310, that the questions 212 differentiated between candidates based on historical data.

At block 710, the processing logic determines ranking information describing an importance of each of the list of questions. For example, the model 310 may determine that question 212A was more important than question 212C in differentiating candidates. Based on this determination, the interview design program 110 may rank question 212A before question 212C.

At block 712, the processing logic sends the list of questions and the ranking information to the first device. For example, the interview design program 110 may send the list of questions and the ranking information to the client 102 for review by the agent building the digital interview.

At block 714, the processing logic receives a set of desired questions from the first device. For example, at the client 102, the agent may review the list of questions provided by the interview design program 110 and accept a reject a certain number of questions. The accepted questions are returned to the interview design program and designated as desired questions. The interview design program 110 may then incorporate the desired questions into the digital interview.

At block 716, the processing logic creates the digital interview with the set of desired questions. For example, the interview design program 110 may incorporate the questions and indicate to the client 102 that the digital interview is completed and ready for administration to candidates for the position.

At block 718, the processing logic presents the digital interview to a candidate on a second device. For example, the digital evaluation platform 101 may administer the digital interview to a candidate. The digital interview may be administered on a device that is accessed by the candidate. The device may include a desktop computer, a mobile computing device such as a laptop, tablet, or smart phone, or some other device.

The processing logic may provide further operations. For example, the processing logic may map a position to one or more competencies based on historical data. In this embodiment, the digital evaluation platform 101 may determine a correlation between the position and the competencies and create an identifier to associate the position and the competencies. Similarly, one or more questions may be mapped to each competency to establish a question set for the competency.

The processing logic may also validate a competency and the associated question set based on a determination, from historical data, that the competency resulted in candidate responses which differentiated the candidate field. For example, the digital evaluation platform 101 may analyze competency data 132 and question data in view of the results data 140 and achievement data 142 to generate impact data 138 for the competency. If the impact data 138 is above a threshold, the competency is identified as validated for use in future evaluations.

The processing logic may also update a predictive model or function based on a recently completed evaluation campaign. For example, the digital evaluation platform 101 may use the machine-learning system 310 to resolve the predictive function and apply the new solution to the current data store 310 to refine the results and effectiveness of the predictive model.

Figure 8:
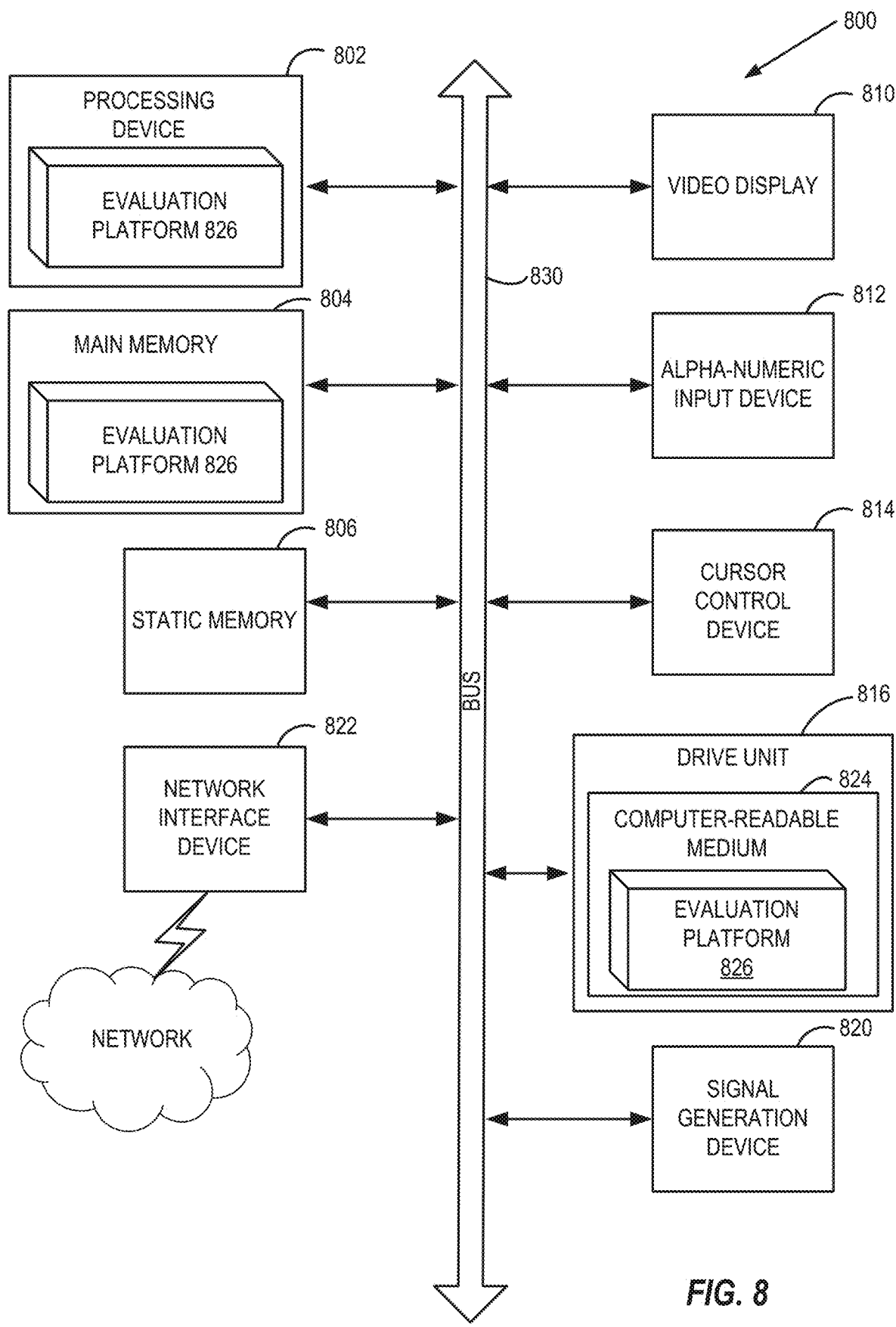
FIG. 8 is a diagrammatic representation of a machine in the exemplary form of a computing system for digital evaluation design, management, and candidate assessment according to an embodiment.

FIG. 8 illustrates a diagrammatic representation of a machine in the exemplary form of a computing system for campaign evaluations according to an embodiment. Within the computing system 800 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for evaluation-assessment, including evaluation result prediction, the identification of prompt clusters, and the generation of template prompts, for performing and evaluating digital interviews and other assessment or evaluations, such as the methods 900, 1100, and 1200 of FIGS. 9, 11, and 12, respectively, as described herein. In one embodiment, the computing system 800 represents various components that may be implemented in the server computing system 104 as described above. Alternatively, the server computing system 104 may include more or less components as illustrated in the computing system 800. The computing system 800 may provide the user interface 300 as seen in FIG. 6.

The exemplary computing system 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, each of which communicate with each other via a bus 830.

Processing device 802 represents one or more processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute the processing logic (e.g., digital evaluation platform 826) for performing the operations and steps discussed herein.

The computing system 800 may further include a network interface device 822. The computing system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-readable storage medium 824 on which is stored one or more sets of instructions (e.g., digital evaluation platform 826) embodying any one or more of the methodologies or functions described herein. The digital evaluation platform 826 may also reside, completely or at least partially, within the main memory 804 and/or within the processing device 802 during execution thereof by the computing system 800, the main memory 804 and the processing device 802 also constituting computer-readable storage media. The digital evaluation platform 826 may further be transmitted or received over a network via the network interface device 822.

While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The interview design program, components, and other features of the digital evaluation platform 101 of FIG. 1 described herein can be implemented as discrete hardware components or integrated in the functionality of hardware components such as ASICS, FPGAs, DSPs, or similar devices. Some portions of the detailed description herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

Figure 9:
FIGS. 9-18 are exemplary graphical user interfaces for creating a digital interview according to one embodiment.

FIGS. 9-18 are exemplary graphical user interface displays for creating a digital interview according to one embodiment. In FIG. 9, a graphical user interface (GUI) display 900 is depicted. In the depicted embodiment, the view 900 is presented to a user on a display device such as the video display device 810 described above. The user, in one example, may be an agent of a company looking to fill a position. In the illustrated embodiment, the view 900 may present a number of interface elements such as buttons, menus, search bars, and other interactive aspects. Upon initiating a request to create a digital interview in the interview design program, the view 900 may present a Create New Position button 902. The button 902 may be presented in the depicted manner or in any of a variety of appearances, sizes, colors, or shapes. The agent may use an interface device such a mouse, touch device, keyboard, or other interface to select the button 902. In response to selection of the button 902, the GUI may present a subsequent view such as the view 1000 of FIG. 10.

Figure 10:
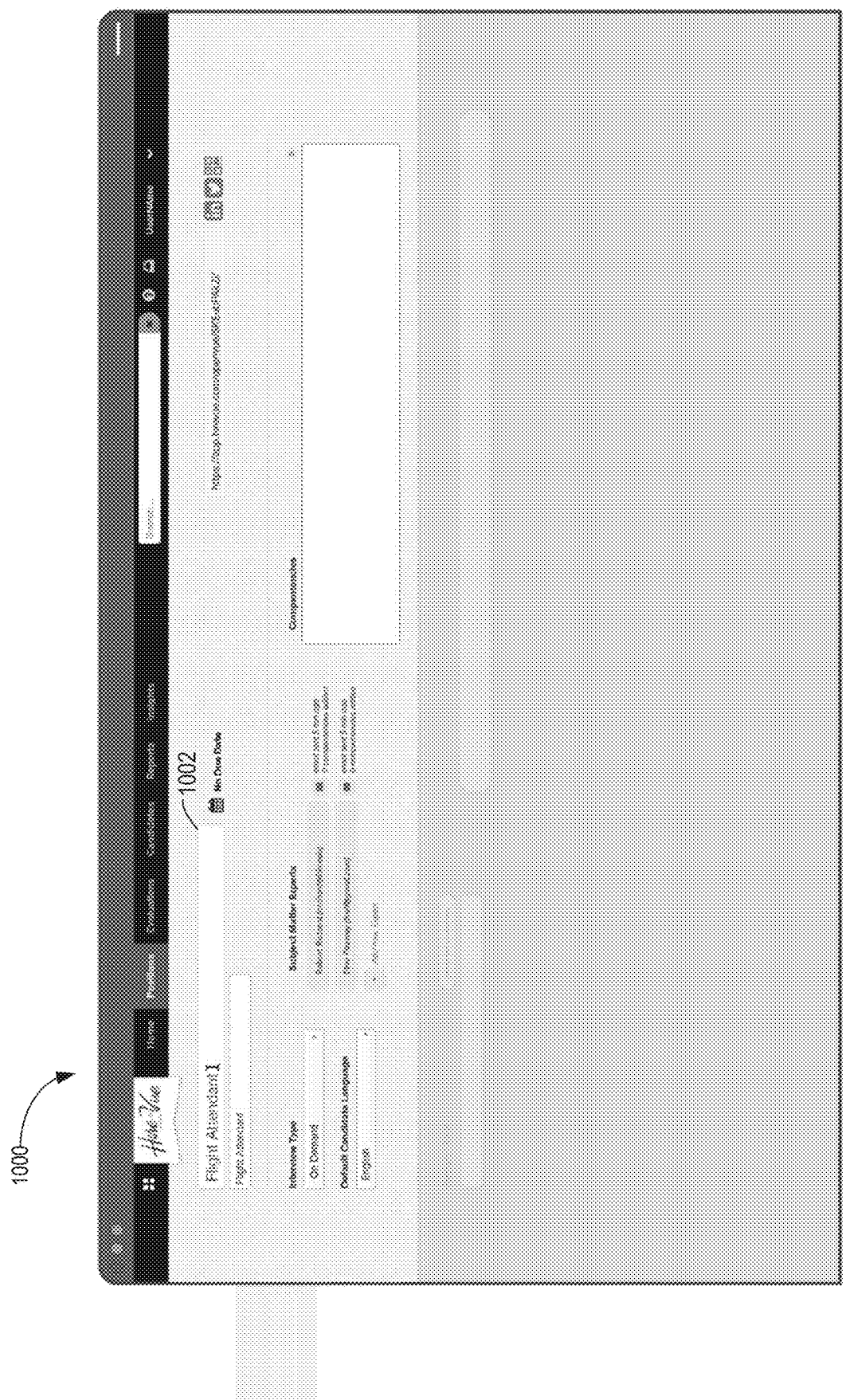

In the example view 1000 depicted in FIG. 10, the GUI provides locations for data entry and selection. For example, the view 1000 may include a field 1002 to enter the position which the company seeks to fill or review. In the illustrated example, the agent has entered or selected the position of "Flight Attendant." In some embodiments, the agent may enter the position by typing in the characters. In another embodiment, the agent may select from a list of positions. In the illustrated example, the interview design application allows the agent to type in the position and then matches the typed string to a stored position. In this view 1000, the interview design program also specifies other information, such as the subject matter experts that correspond to the position. The view 1000 may also allow the agent to select or view other settings and options that may be incorporated in the building of the interview.

Figure 11:
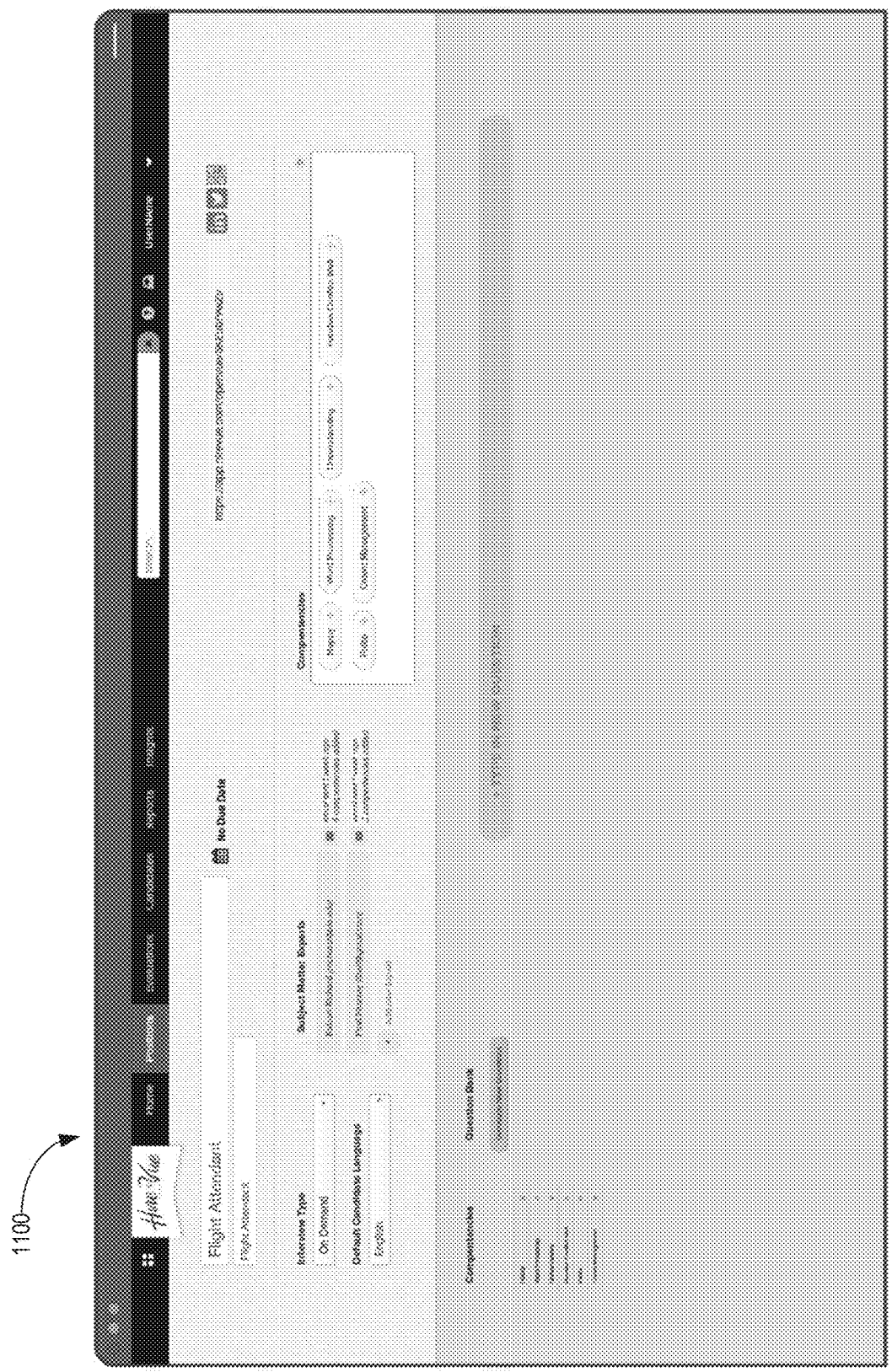
Figure 12:

FIG. 11 depicts an example of a view 1100 of a graphical user interface. In the depicted embodiment, the interview design program has correlated the position of "Flight Attendant" with competencies submitted by subject matter experts. In the illustrated embodiment, the competencies are mined from communications, such as emails, sent by the subject matter experts. These competencies are shown individually in the view 1100.

In another embodiment, the competencies may be extracted from a database. For example, previous records for interviews for flight attendants may include information relating to competencies related to the position of flight attendant. The interview design program may identify this information and present the competencies to the agent. The agent may accept the competencies, rejection some or all of the competencies, or add to the competencies by requesting additional competencies or manually selecting or specifying additional competencies.

Once the selection of competencies is complete, the agent may select to generate questions associated with the selected competencies. In the illustrated view 1200 of FIG. 12, the agent is electing to continue with the suggested competencies and generate new questions for the interview.

Figure 13:
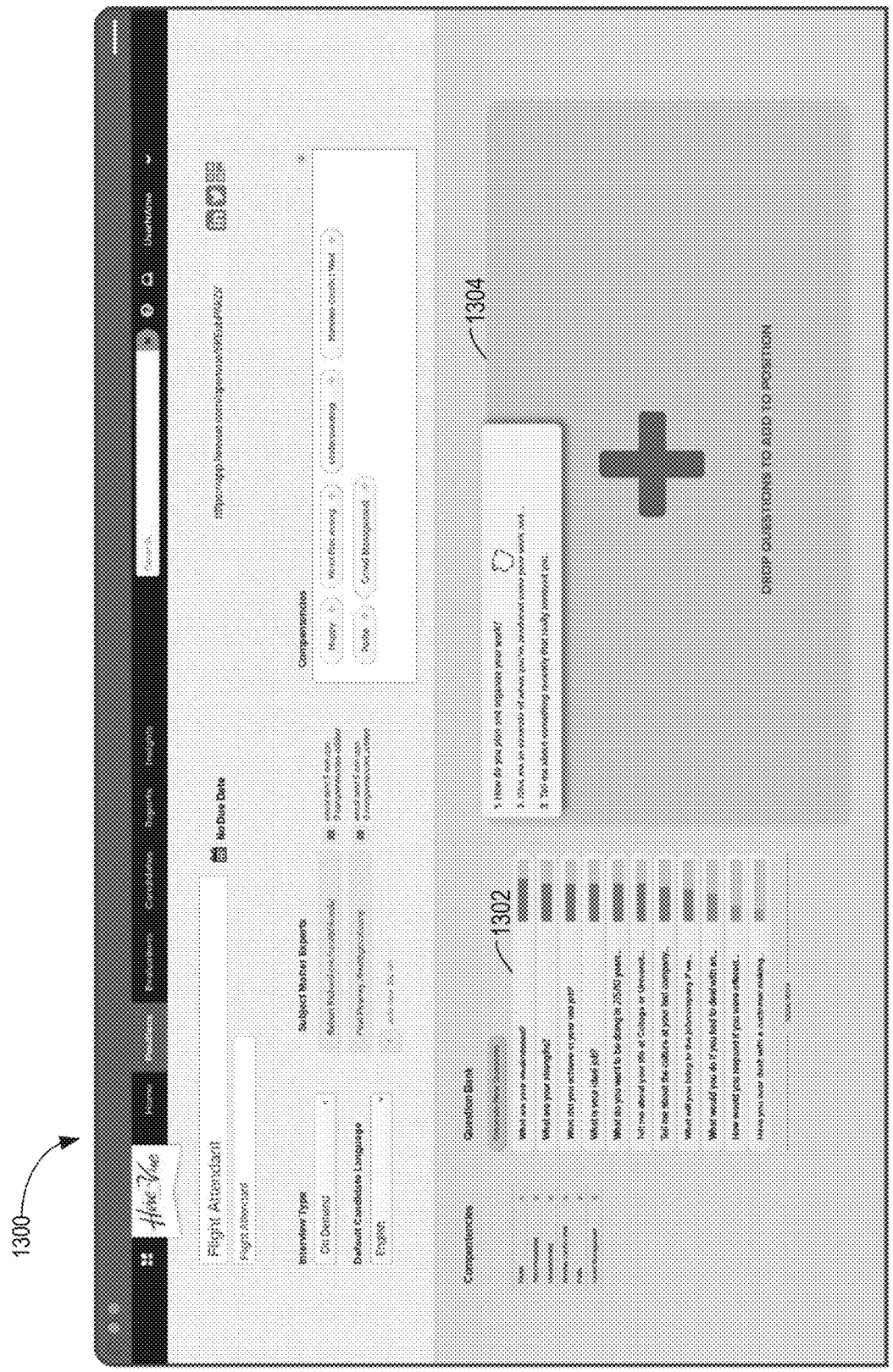

In FIG. 13, the GUI presents a view 1300 to the agent. The view includes suggested questions 1302. In the illustrated example, the suggested questions 1302 include indicators which help the agent to identify which questions have historically been determinative in selecting a candidate for hiring. The suggested questions 1302 may be organized by competency or simply by impact across all the selected competencies. Here, the question of "What are your weaknesses?" includes a mostly-full green bar. Both the color and fill amount indicate a level of impact or decisiveness for the question. The agent can use this visual indicator to gauge the value of the question in considering which questions to include. In the illustrated example, the agent may select a question by dragging and dropping the question to the selection area 1304. In other embodiments, the questions may be selected by checking a box or radio button corresponding to the question. Other schemes for selecting the questions may also be used. In some embodiments, questions may be selected automatically. For example, the interview design program may automatically select questions which have an impact value above a certain threshold. That threshold may be determined automatically based on the available questions, specified by the agent, or otherwise determined.

Figure 14:
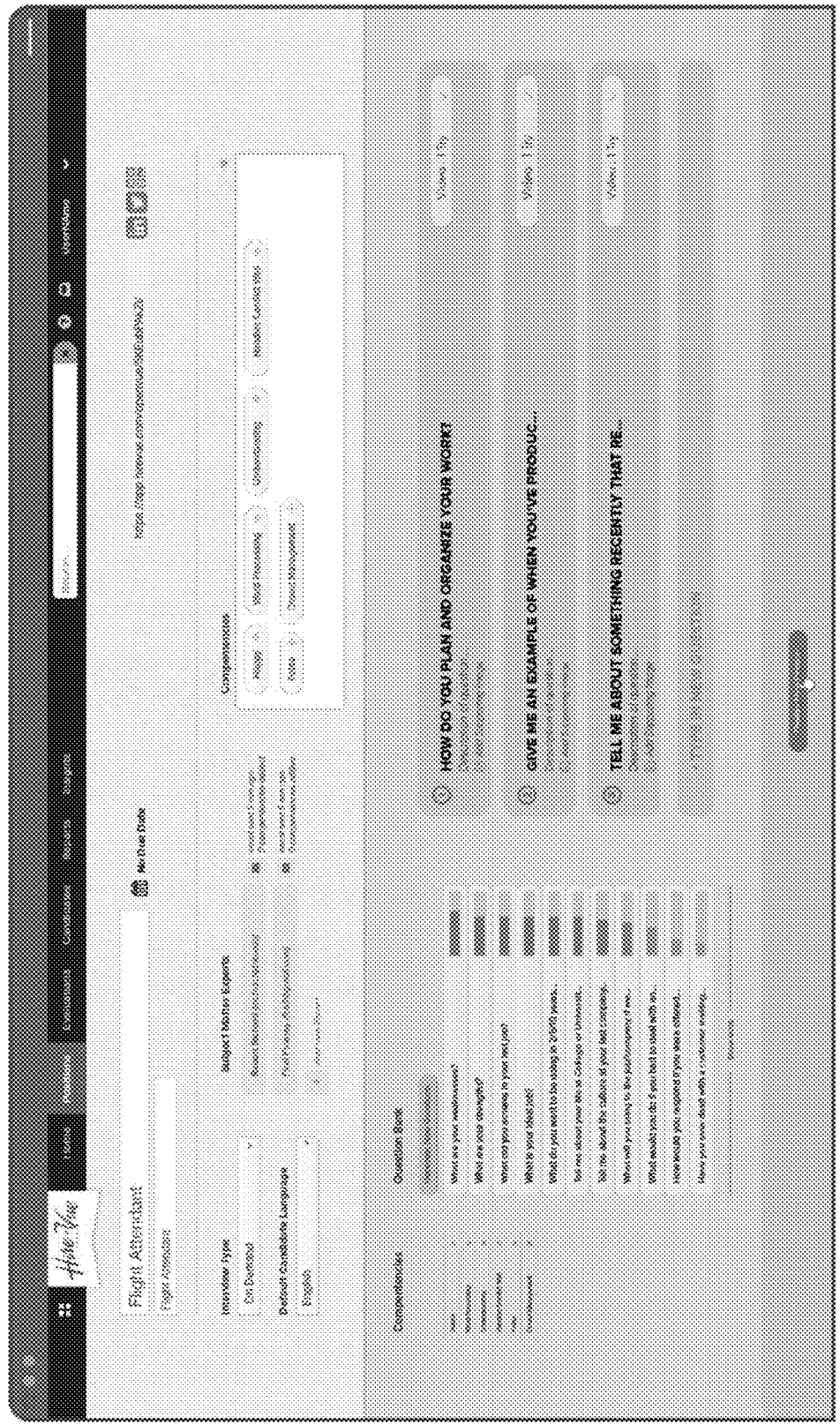

Once the agent has selected questions from the question bank, the interview design program may add the questions to the digital interview. In FIG. 14, the GUI displays a view 1400 in which the questions have been populated. The selected questions may include a numbering to indicate in which order the questions will be presented in the interview. The illustrated example also includes other options that may be used by the agent. The questions may include options such as determining how many tries a candidate may be given to answer the question, images that may be displayed during presentation of the question, additional description, etc. The interview design program may also allow the agent to type in additional questions, reorder the questions, edit the selected questions, or perform other operations. The illustrate view 1400 also depicts the agent selecting to finalize the new position using the selected questions and competencies. In response to the selection to finalize the position, the interview design program may store the correlation of the competencies to the position. The interview design program may generate the interview and provide a manner for distributing the interview to candidates. For example, the GUI may provide a link which can be recorded by the agent and distributed or indicate that the interview is not available for release to potential candidates. Other embodiments may include other functionality.

Figure 15:
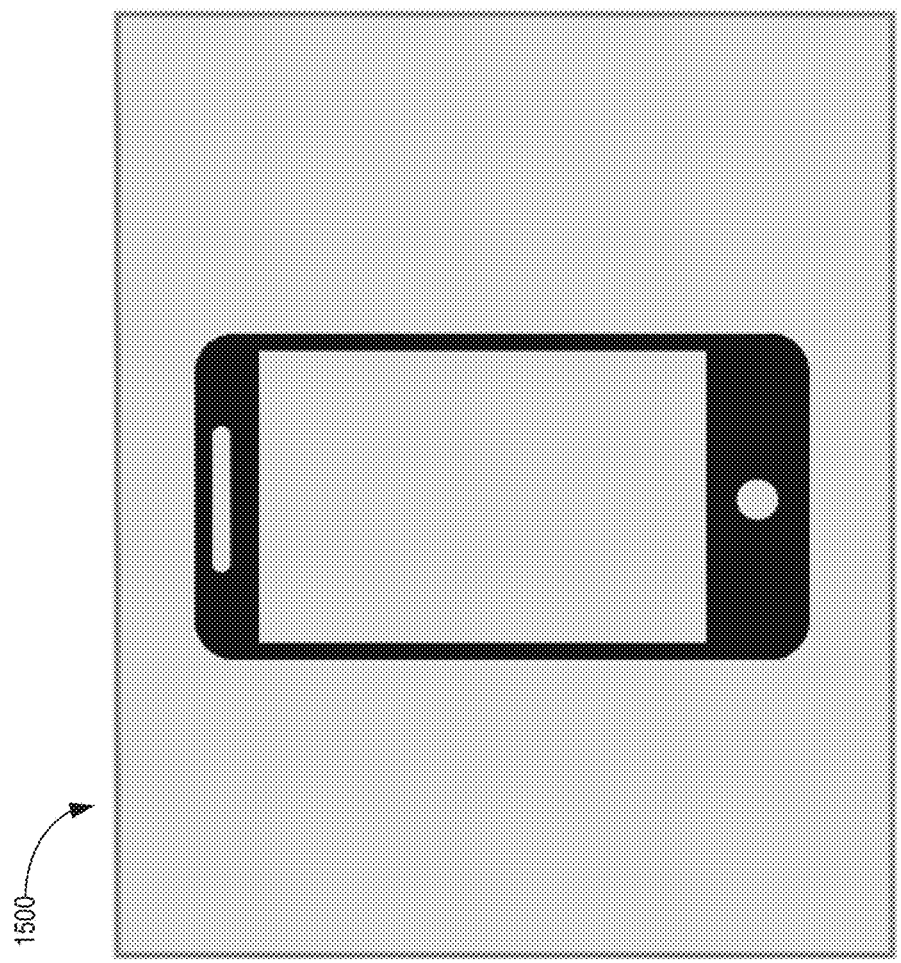

The digital interview may be presented to candidates on a wide range of digital devices. For example, FIG. 15 depicts one example of a second device 1500, in particular a mobile device, on which the interview may be administered. The interview may be distributed to and administered on a desktop, a laptop, a tablet, a mobile device, or other digital device. In some embodiments, the second device 1500 may provide the ability to present and record video and audio for presentation of and responding to the interview. Other information, such as location, may be provided by the device as part of the information returned by the candidate as a response to the interview. In some embodiments, the digital interview may be downloaded to the device 1500. In other embodiments, the digital interview may be streamed by the device 1500. Other embodiments may include other presentation schemes.

Figure 16:
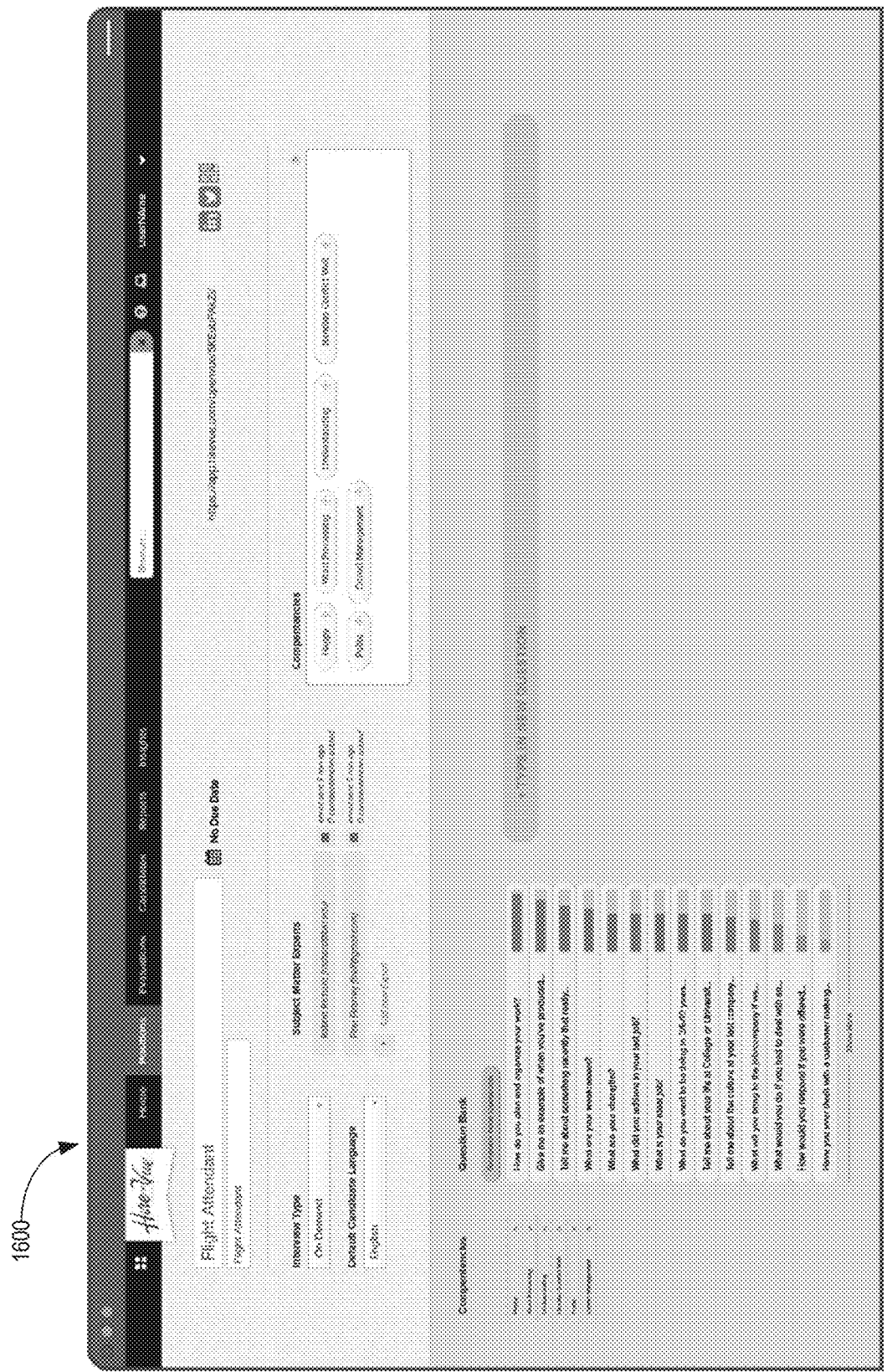

FIG. 16 includes a view 1600 in which the agent has populated the competencies and the suggested questions corresponding to the competencies. In some examples, the agent may edit the list of generated questions by adding or removing competencies. In some embodiments, the agent may also edit the list of suggested questions by typing in a question and looking for a match in the question bank. In one example, the newly added question may be compared to the suggested questions to determine a similarity and assign a corresponding indicator of impact.

Figure 17:
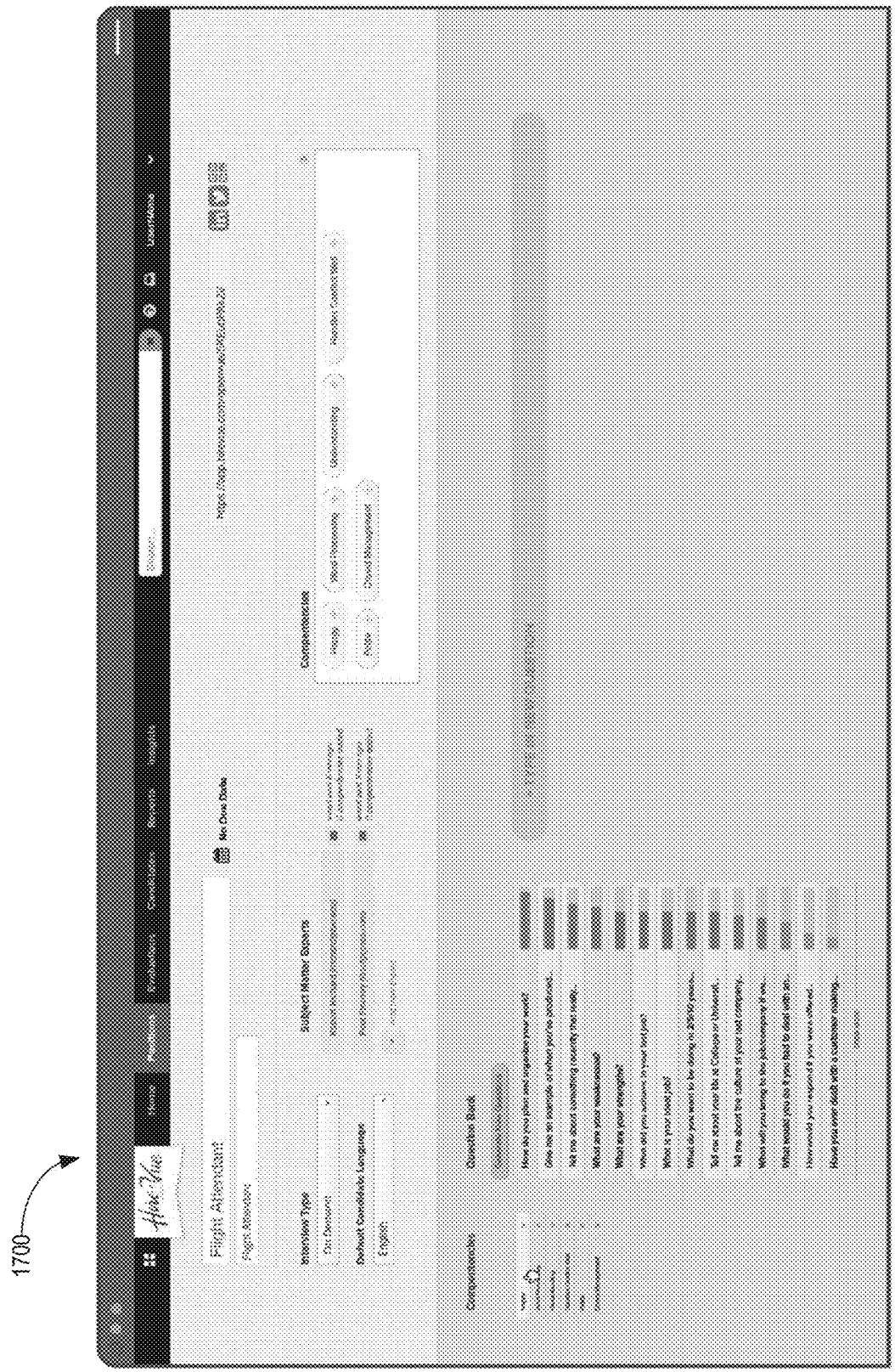

FIG. 17 includes a view 1700 in which the agent has selected a competency, specifically the competency of "Happy." In response, the GUI highlights the questions which may bear on a candidates score in the Happy competency. The GUI may also indicate which questions would be removed if the agent elected to remove the Happy competency from the selected competencies. This functionality by be in response to a hover action or actively selecting the competency. Other features or functionality may be included.

Figure 18:
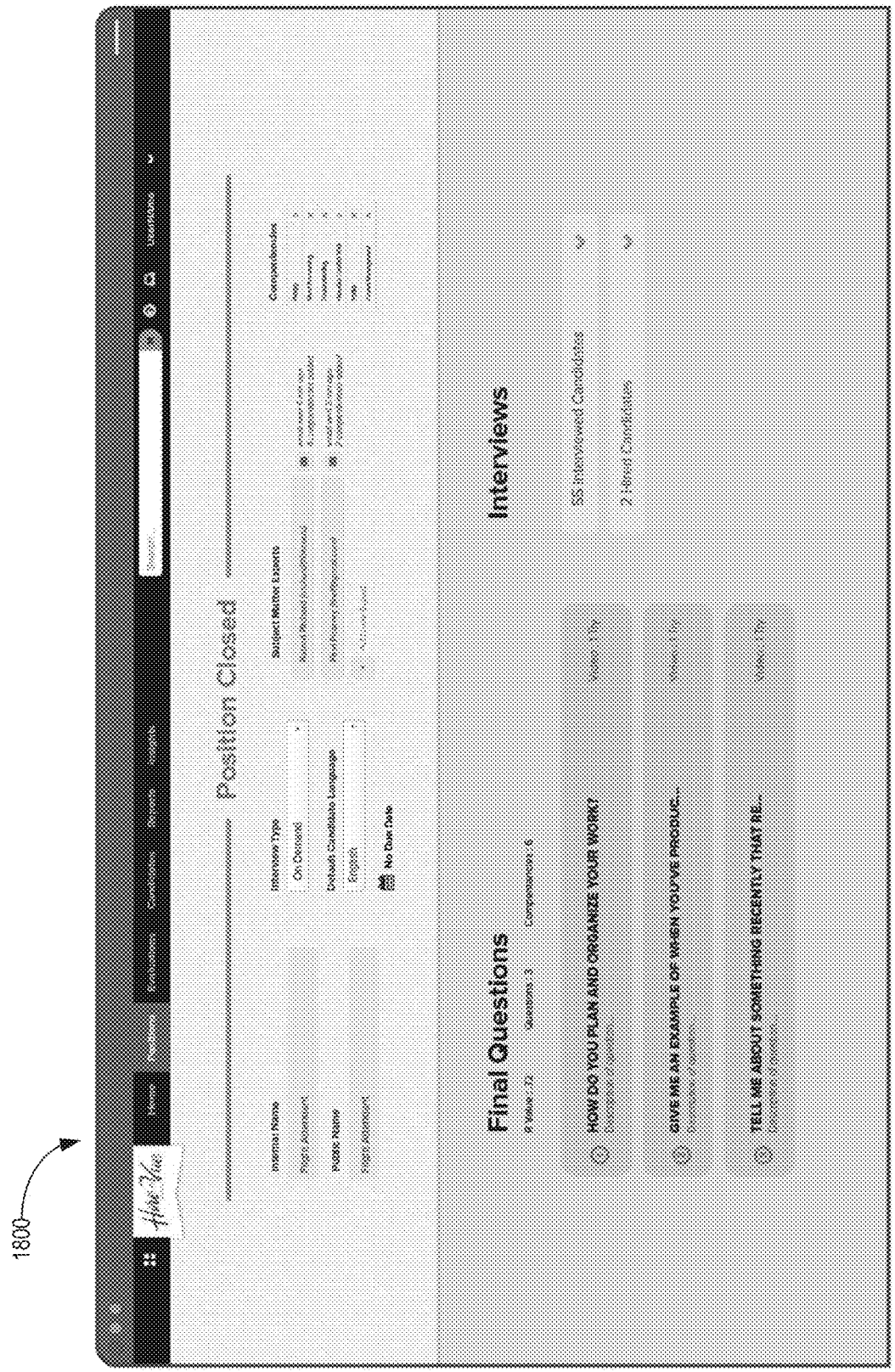

FIG. 18 includes a view 1800 in which the position has been finalized and the interview administered to the candidates. In the illustrated embodiment, the agent may review the number of candidates who completed the interview, how many were hired, how many and what questions were asked, how many and what competencies were involved, and other information regarding the position, experts, and settings. In particular, an R Value (shown as 0.72) may be presented to the agent. The R Value corresponds to a statistical validity of the questions. In one example, the R Value communicates a correlation of the questions with an outcome relating to the candidate. As described above relative to the performance metric, this may be related to sales numbers, hitting goals, project completions, pay raises, promotions, time with the company, test scores, commissions earned, performance reviews, etc. The R Value demonstrates an impact or effectiveness at predicting the performance of the candidate. In some embodiments, this value may be drawn using the data from the current interview campaign, historical data from previous hires and performers, or other inputs. This data can be used to select questions for improved interviews and assessments in the future.

As a whole, the information presented in the view 1800 may help the agent to understand the effect of the competencies chosen as well as which questions produced an effect on the candidate field and made an accurate prediction of candidate performances. In some examples, the agent or other reviewer may be presented a similar view when reviewing candidate responses prior to hiring a candidate.

It should be noted that, while FIGS. 9-18 include various views and examples of elements of the interview design program and process, some steps or actions may be completed manually by the agent or, alternatively, automatically by the interview design program. For example, a fully automated approach may take in a position and return a finalized interview without further input from the agent. Another example may require input from the agent at every step. Other examples may include some automated steps with some manual steps. Various approaches may be selected by the agent or build into the program. The figures and accompanying description present on a few examples of different embodiment of the interview design program and competency-based questions selection for a digital evaluation platform.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "analyzing," "capturing," "executing," "defining," "specifying," "selecting," "recreating," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
    receiving, at an interview design program hosted by a digital evaluation platform, a request over a network from a first device to create a digital interview to evaluate first candidates, the request identifying a position for which the first candidates are to be evaluated;
    receiving, from the first device at the interview design program, a first selection of a set of selected competencies, wherein the set of selected competencies comprises a subset or all of a list of potential competencies associated with the position;
    retrieving, by the digital evaluation platform from historical interview data, questions asked of candidates in the past that are mapped, within the historical interview data, to competencies listed within the set of selected competencies;
    populating, by the digital evaluation platform derived from a first portion of the historical interview data, a matrix with a binary value for each of the questions within a competency of the set of selected competencies, the binary value indicating whether or not each of the questions was presented to one or more past candidates;
    populating, by the digital evaluation platform derived from the first portion of the historical interview data, a competency score index with a competency score, for each of the one or more past candidates, associated with the competency;
    executing, by the digital evaluation platform on a predictive model that takes as input a combination of values of the matrix and of the competency score index, a machine-learning algorithm to determine a subset of the questions that results in a change to the competency score for each of the subset of the questions, wherein the change is effective at distinguishing at least a first candidate from a second candidate of the one or more past candidates with reference to the competency;
    repeating the populating and executing, by the digital evaluation platform, using a k-folding approach on a second portion of the historical interview data to generate a validated predictive model that exceeds a set of predefined performance targets, wherein the second portion of the historical interview data is a fraction of the historical interview data selected for statistical validation of the predictive model for predicting competency;
    creating, by the interview design program executing the validated predictive model on the digital evaluation platform, the digital interview with a set of selected questions from among the subset of the questions; and
    presenting, by the digital evaluation platform to elicit responses to the set of selected questions, the digital interview to a candidate of the first candidates on a second device.

2. The method of claim 1, further comprising:
    determining, by the interview design program, ranking information describing an importance of each of the subset of the questions relative to individual competencies of the set of selected competencies;
    sending, over the network by the interview design program to the first device, the subset of the questions and the ranking information; and
    receiving, from the first device at the interview design program, a second selection of the set of selected questions comprising one or more of the subset of the questions.

3. The method of claim 1, further comprising training, by the digital evaluation platform, the predictive model to predict future candidate performance based on current candidate competency scores, the training comprising using the machine-learning algorithm to correlate historical competency scores of past candidates with hiring results for the past candidates.

4. The method of claim 1, wherein the machine-learning algorithm comprises at least one or a combination of a support vector machine, a regression algorithm, a neural network, a tree-structured classifier, or an ensemble algorithm.

5. The method of claim 1, wherein the subset of the questions comprises questions from a validated question bank.

6. The method of claim 5, wherein the questions from the validated question bank are clustered based on a degree of similarity.

7. The method of claim 1, further comprising:
    populating, by the digital evaluation platform, a data store with an organizational structure to associate the position with a plurality of historical position descriptions, wherein each of the plurality of historical position descriptions maps to the list of potential competencies;
    sending, over the network by the interview design program, a preliminary response to the request from the first device to create the digital interview, the preliminary response comprising the plurality of historical position descriptions;
    receiving, from the first device at the interview design program, a position description selection comprising a subset or all of the plurality of historical position descriptions; and
    determining, by the interview design program, the list of potential competencies with respect to the position description selection.

8. The method of claim 1, wherein the determining the subset of the questions further comprises:
    identifying, by the digital evaluation platform, at least one of a plurality of historical position descriptions as related to the position; and
    identifying, by the digital evaluation platform, the list of potential competencies as related to the at least one of the plurality of historical position descriptions.

29

9. A system comprising:
a data storage device; and
a processing device, coupled to the data storage device, to execute a digital evaluation platform to:
  receive, at an interview design program hosted by the digital evaluation platform, a request over a network from a first device to create a digital interview to evaluate first candidates, the request identifying a position for which the first candidates are to be evaluated;
  receive, from the first device at the interview design program, a first selection of a set of selected competencies, wherein the set of selected competencies comprises a subset or all of a list of potential competencies associated with the position;
  retrieve, from historical interview data, questions asked of candidates in the past that are mapped, within the historical interview data, to competencies listed within the set of selected competencies;
  populate a matrix with a binary value for each of the questions within a competency of the set of selected competencies, the binary value indicating whether or not each of the questions was presented to one or more past candidates, wherein the binary value is derived from a first portion of the historical interview data;
  populate a competency score index with a competency score, for each of the one or more past candidates, associated with the competency, wherein the competency score is derived from the first portion of the historical interview data;
  execute, on a predictive model that takes as input a combination of values of the matrix and of the competency score index, a machine-learning algorithm to determine a subset of the questions that results in a change to the competency score for each of the subset of the questions, wherein the change is effective at distinguishing at least a first candidate from a second candidate of the one or more past candidates with reference to the competency;
  repeat the populate and execute, by the digital evaluation platform, using a k-folding approach on a second portion of the historical interview data to generate a validated predictive model that exceeds a set of predefined performance targets, wherein the second portion of the historical interview data is a fraction of the historical interview data selected for statistical validation of the predictive model for predicting competency;
  create, by the interview design program executing the validated predictive model, the digital interview with a set of selected questions from among the subset of the questions; and
  present, by the digital evaluation platform to elicit responses to the set of selected questions, the digital interview to a candidate of the first candidates on a second device.

10. The system of claim 9, wherein the digital evaluation platform is further to:
  determine, by the interview design program, ranking information describing an importance of each of the subset of the questions relative to individual competencies of the set of selected competencies;
  send, over the network by the interview design program to the first device, the subset of the questions and the ranking information; and

30 receive, from the first device at the interview design program, a second selection of the set of selected questions comprising one or more of the subset of the questions.

11. The system of claim 9, wherein the digital evaluation platform is further to train the predictive model to predict future candidate performance based on current candidate competency scores, the training comprising using the machine-learning algorithm to correlate historical competency scores of past candidates with hiring results for the past candidates.

12. The system of claim 9, wherein the machine-learning algorithm comprises at least one or a combination of a support vector machine, a regression algorithm, a neural network, a tree-structured classifier, or an ensemble algorithm.

13. The system of claim 9, wherein the subset of the questions comprises questions from a validated question bank.

14. The system of claim 13, wherein the questions from the validated question bank are clustered based on a degree of similarity.

15. The system of claim 9, wherein the digital evaluation platform is further to:
  populate a data store with an organizational structure to associate the position with a plurality of historical position descriptions, wherein each of the plurality of historical position descriptions maps to the list of potential competencies;
  send, over the network, a preliminary response to the request from the first device to create the digital interview, the preliminary response comprising the plurality of historical position descriptions;
  receive, from the first device, a position description selection comprising a subset or all of the plurality of historical position descriptions; and
  determine the list of potential competencies with respect to the position description selection.

16. The system of claim 9, wherein the determination of the subset of the questions further comprises:
  identify, by the digital evaluation platform, at least one of a plurality of historical position descriptions as related to the position; and
  identify, by the digital evaluation platform, the list of potential competencies as related to the at least one of the plurality of historical position descriptions.

17. A computer-readable non-transitory storage medium comprising executable instructions to cause a processing device to:
  receive, at an interview design program hosted by a digital evaluation platform, a request over a network from a first device to create a digital interview to evaluate first candidates, the request identifying a position for which the first candidates are to be evaluated;
  receive, from the first device at the interview design program, a first selection of a set of selected competencies, wherein the set of selected competencies comprises a subset or all of a list of potential competencies associated with the position;
  retrieve, from historical interview data, questions asked of candidates in the past that are mapped, within the historical interview data, to competencies listed within the set of selected competencies;
  populate a matrix with a binary value for each of the questions within a competency of the set of selected competencies, the binary value indicating whether or not each of the questions was presented to one or more past candidates, wherein the binary value is derived from a first portion of the historical interview data;

populate a competency score index with a competency score, for each of the one or more past candidates, associated with the competency, wherein the competency score is derived from the first portion of the historical interview data;

execute, by the digital evaluation platform on a predictive model that takes as input a combination of values of the matrix and the competency score index, a machine-learning algorithm to determine a subset of the questions that results in a change to the competency score for each of the subset of the questions, wherein the change is effective at distinguishing at least a first candidate from a second candidate of the one or more past candidates with reference to the competency;

repeat the populate and execute, by the digital evaluation platform, using a k-folding approach on a second portion of the historical interview data to generate a validated predictive model that exceeds a set of predefined performance targets, wherein the second portion of the historical interview data is a fraction of the historical interview data selected for statistical validation of the predictive model for predicting competency;

create, by the interview design program executing the validated predictive model on the digital evaluation platform, the digital interview with a set of selected questions from among the subset of the questions; and present, by the digital evaluation platform to elicit responses to the set of selected questions, the digital interview to a candidate of the first candidates on a second device.

18. The computer-readable non-transitory storage medium of claim 17, wherein the executable instructions cause the processing device further to:

determine, by the interview design program, ranking information describing an importance of each of the subset of the questions relative to individual competencies of the set of selected competencies;

send, over the network by the interview design program to the first device, the subset of the questions and the ranking information; and receive, from the first device at the interview design program, a second selection of the set of selected questions comprising one or more of the subset of the questions.

19. The computer-readable non-transitory storage medium of claim 17, further comprising training, by the digital evaluation platform, the predictive model to predict future candidate performance based on current candidate competency scores, the training comprising using the machine-learning algorithm to correlate historical competency scores of past candidates with hiring results for the past candidates.

20. The computer-readable non-transitory storage medium of claim 17, wherein the machine-learning algorithm comprises at least one or a combination of a support vector machine, a regression algorithm, a neural network, a tree-structured classifier, or an ensemble algorithm.

* * * * *